J. G. VINCENT.
ADDING MACHINE.
APPLICATION FILED SEPT. 24, 1906.
1,043,882.
Patented Nov. 12, 1912.
13 SHEETS—SHEET 1.
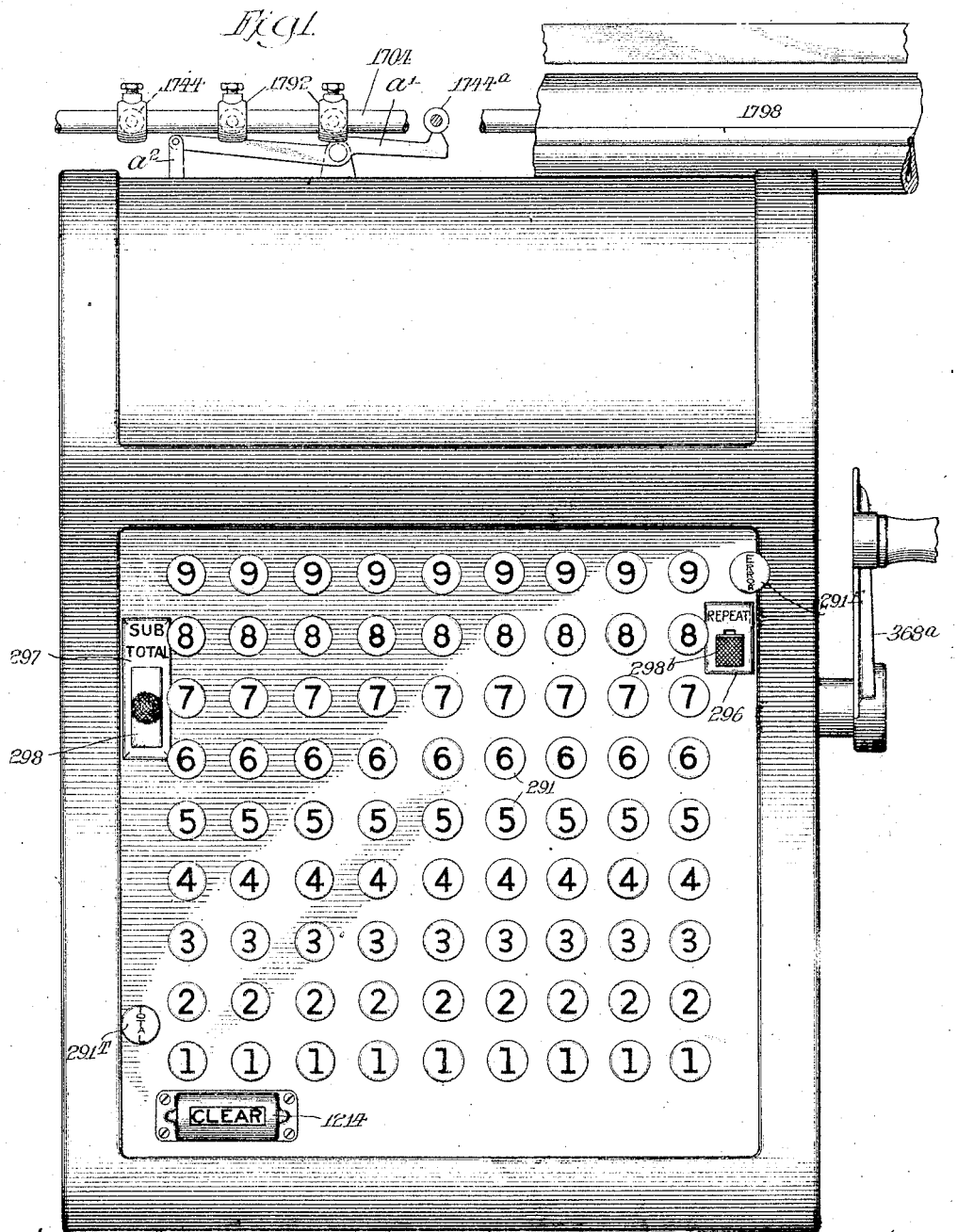

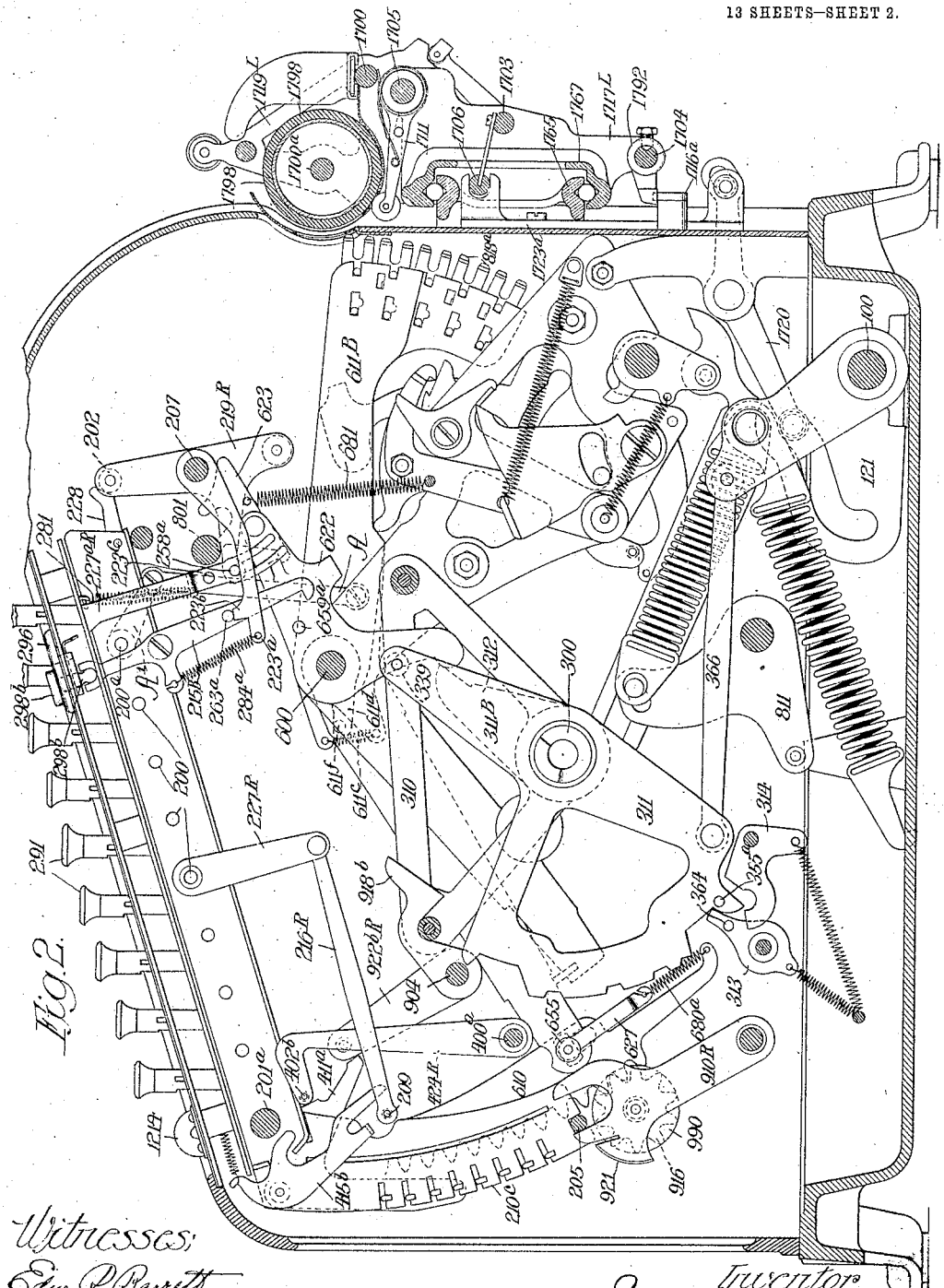

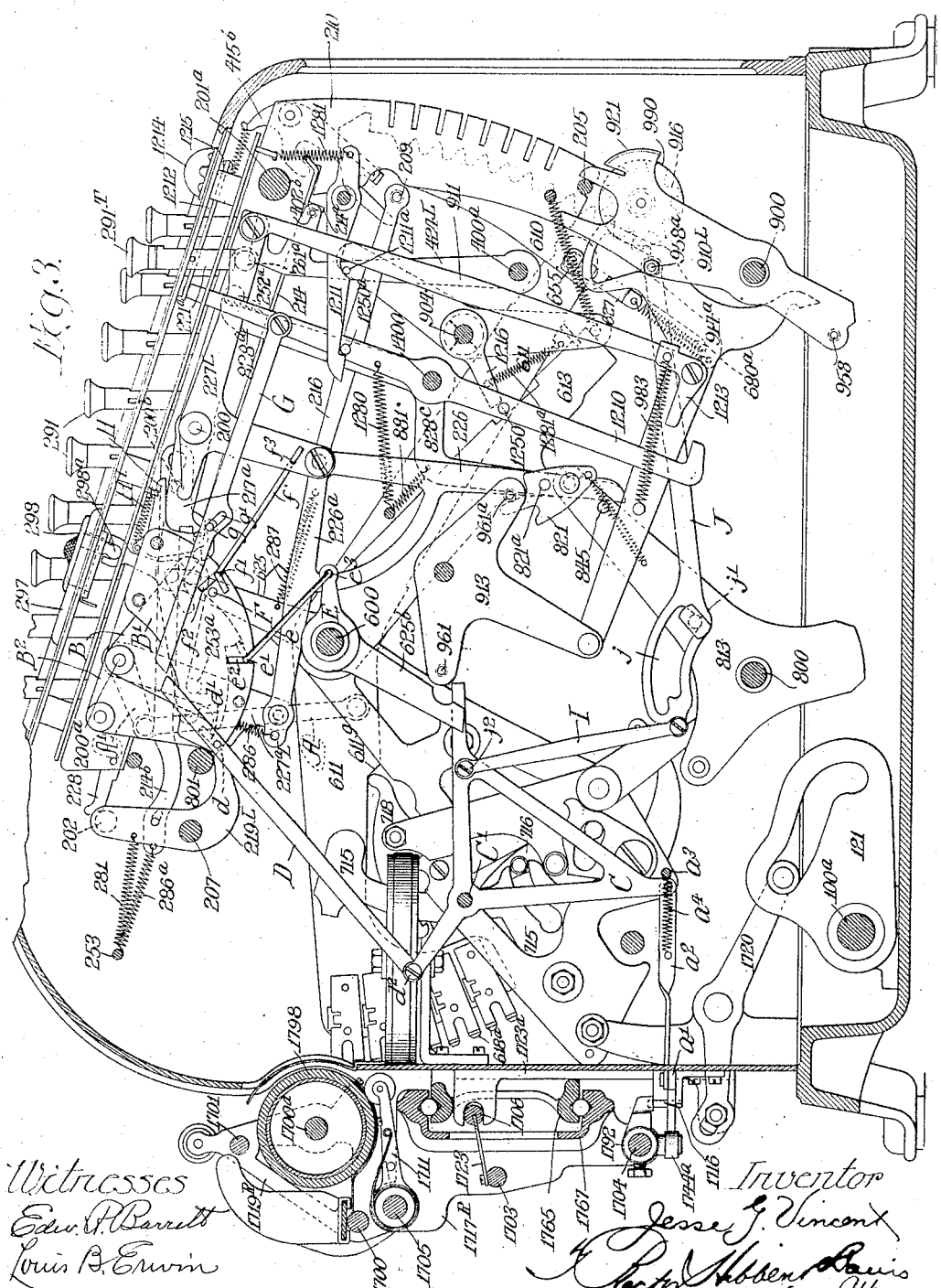

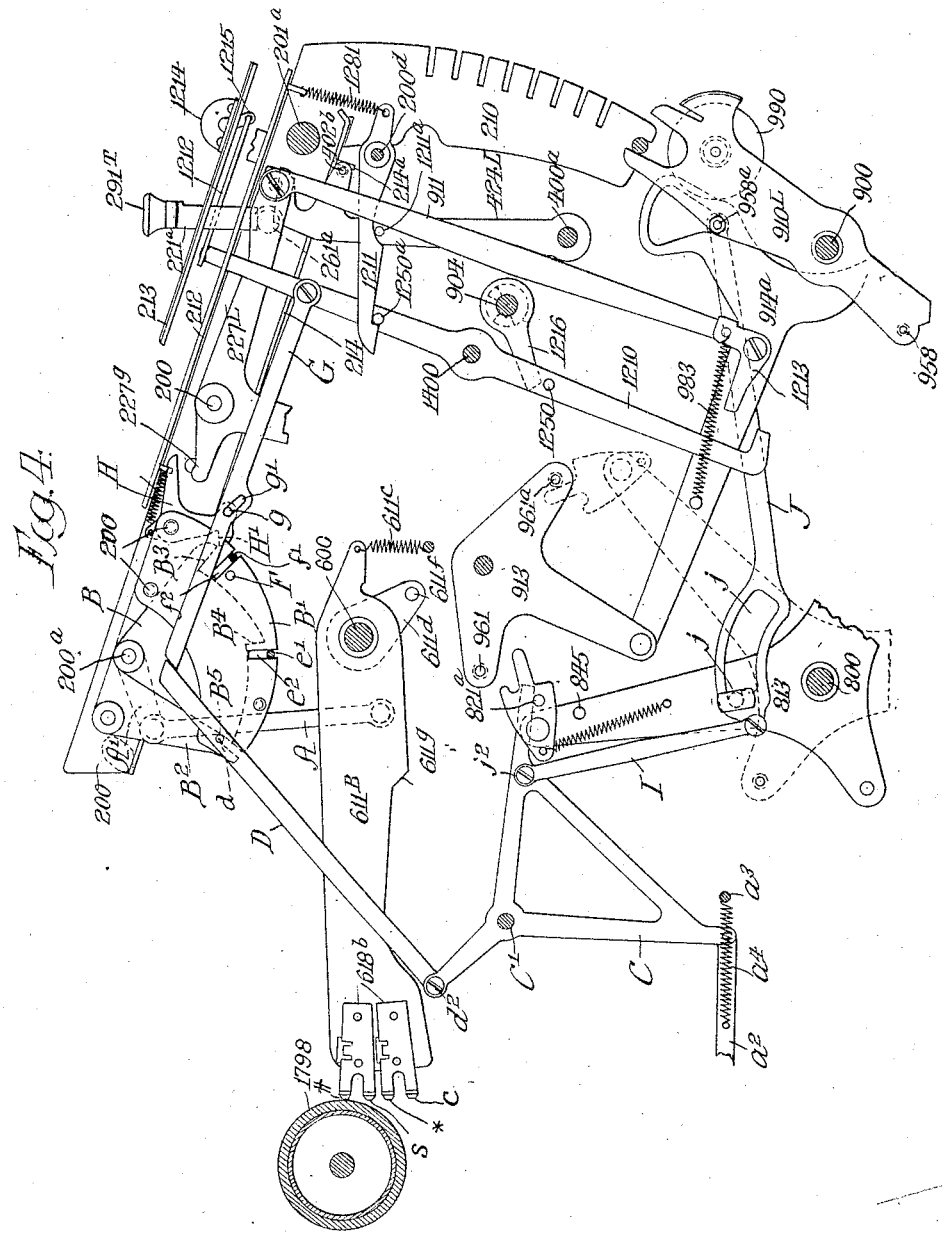

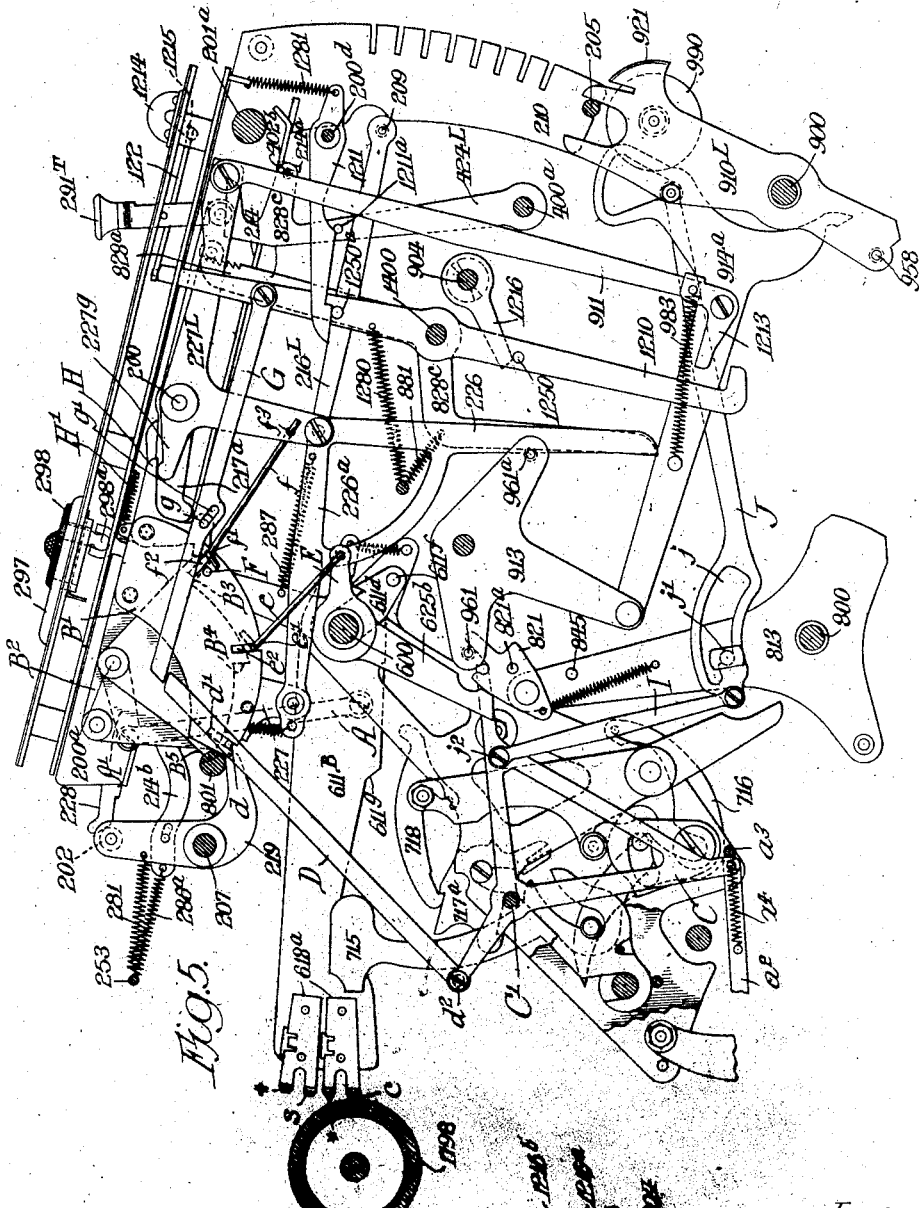

J. G. VINCENT.
ADDING MACHINE.
APPLICATION FILED SEPT. 24, 1906.
1,043,882.
Patented Nov. 12, 1912.
13 SHEETS—SHEET 6.
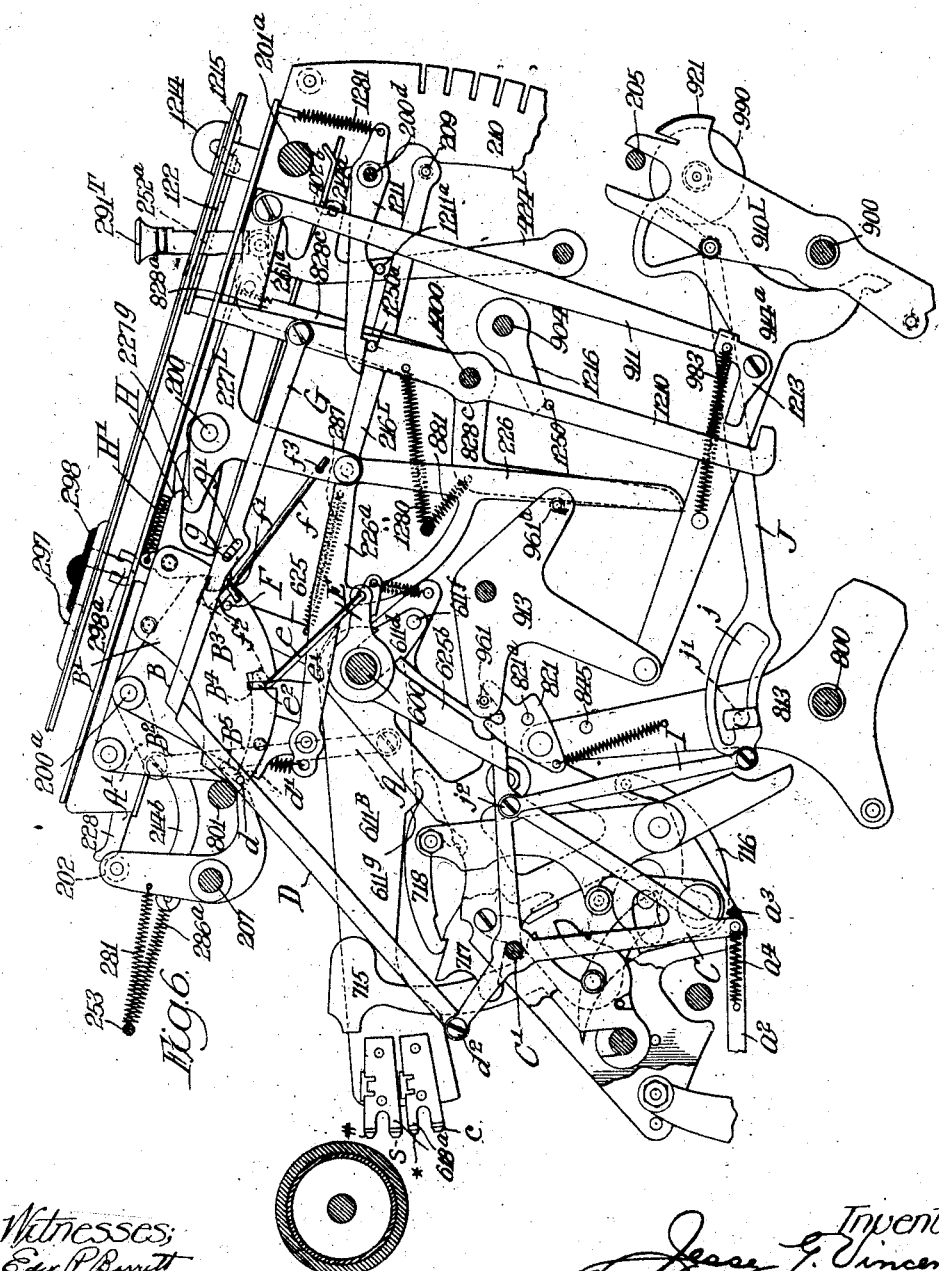

J. G. VINCENT.
ADDING MACHINE.
APPLICATION FILED SEPT. 24, 1906.
1,043,882.
Patented Nov. 12, 1912.
13 SHEETS—SHEET 7.
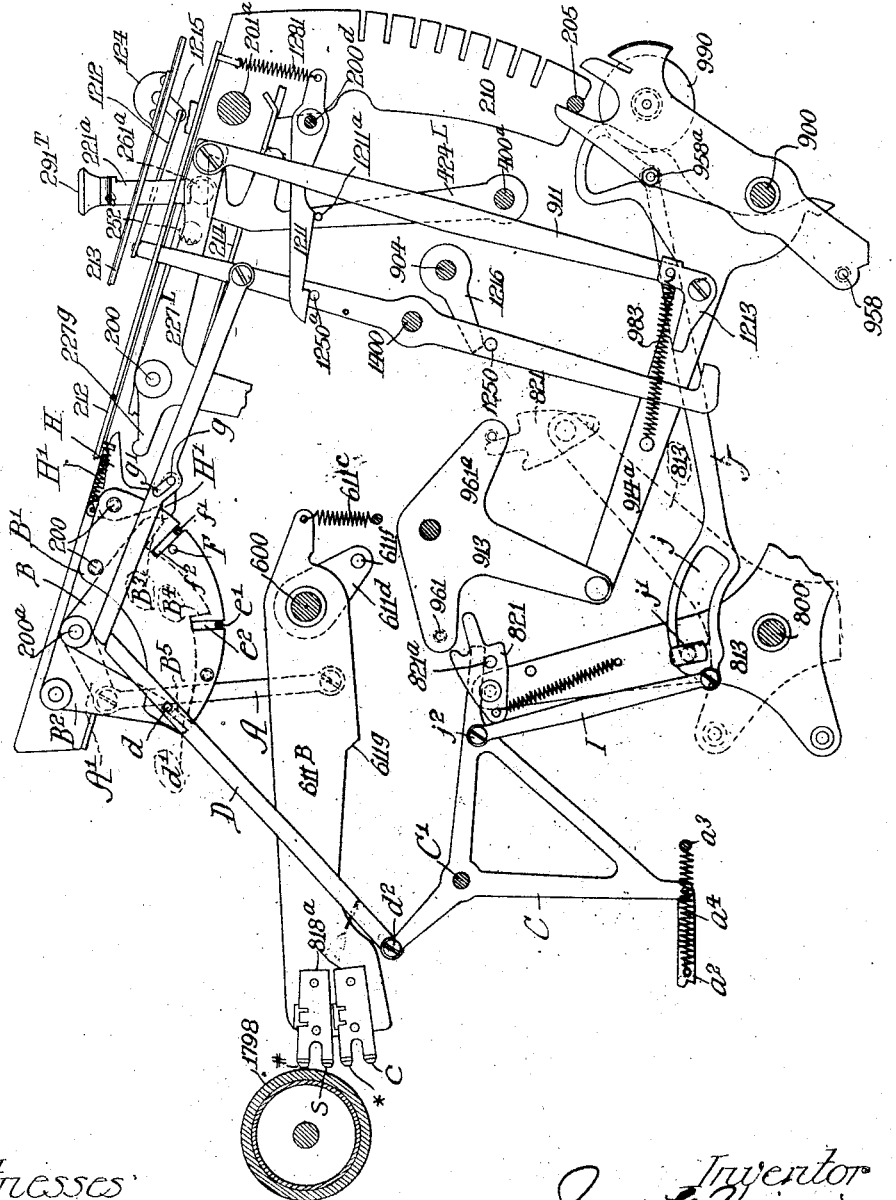

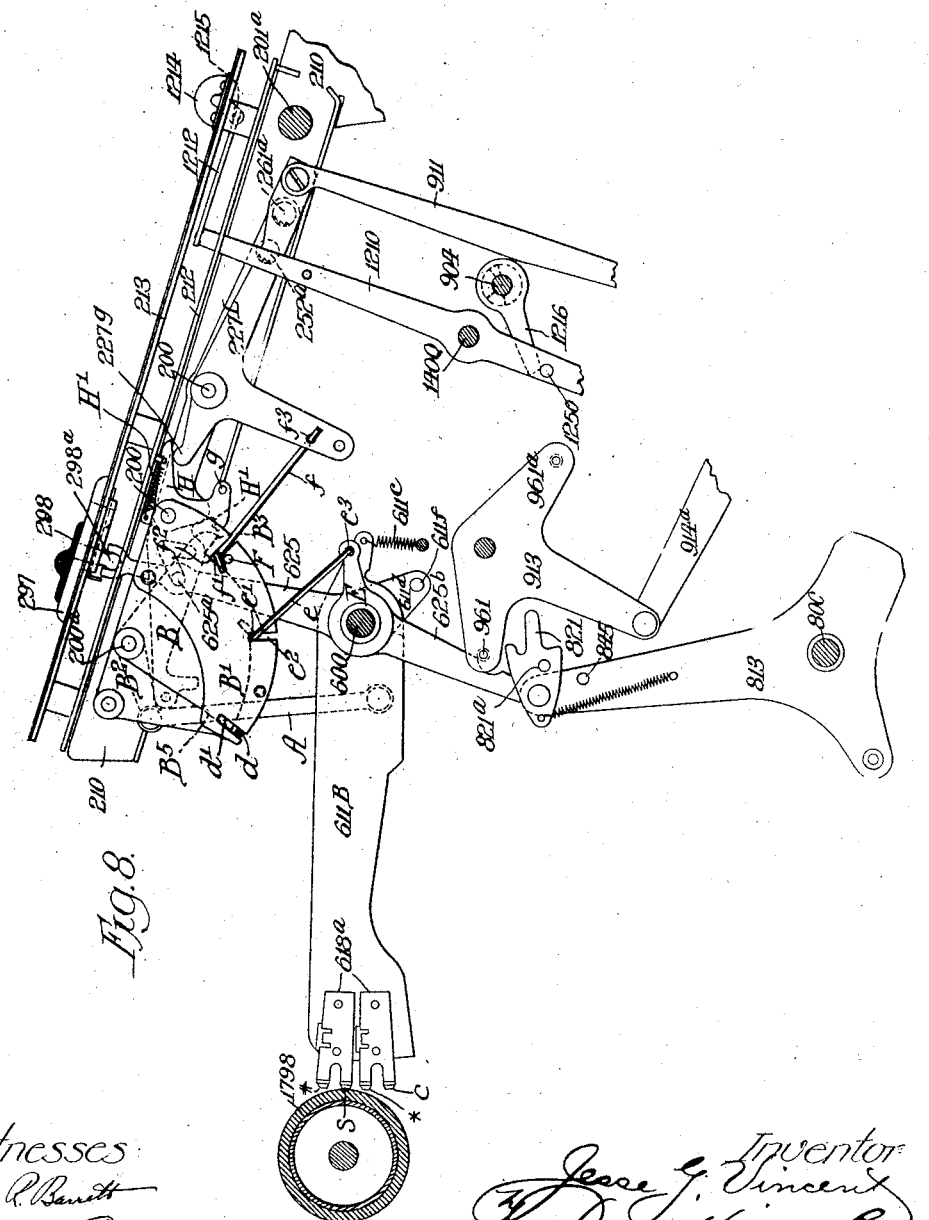

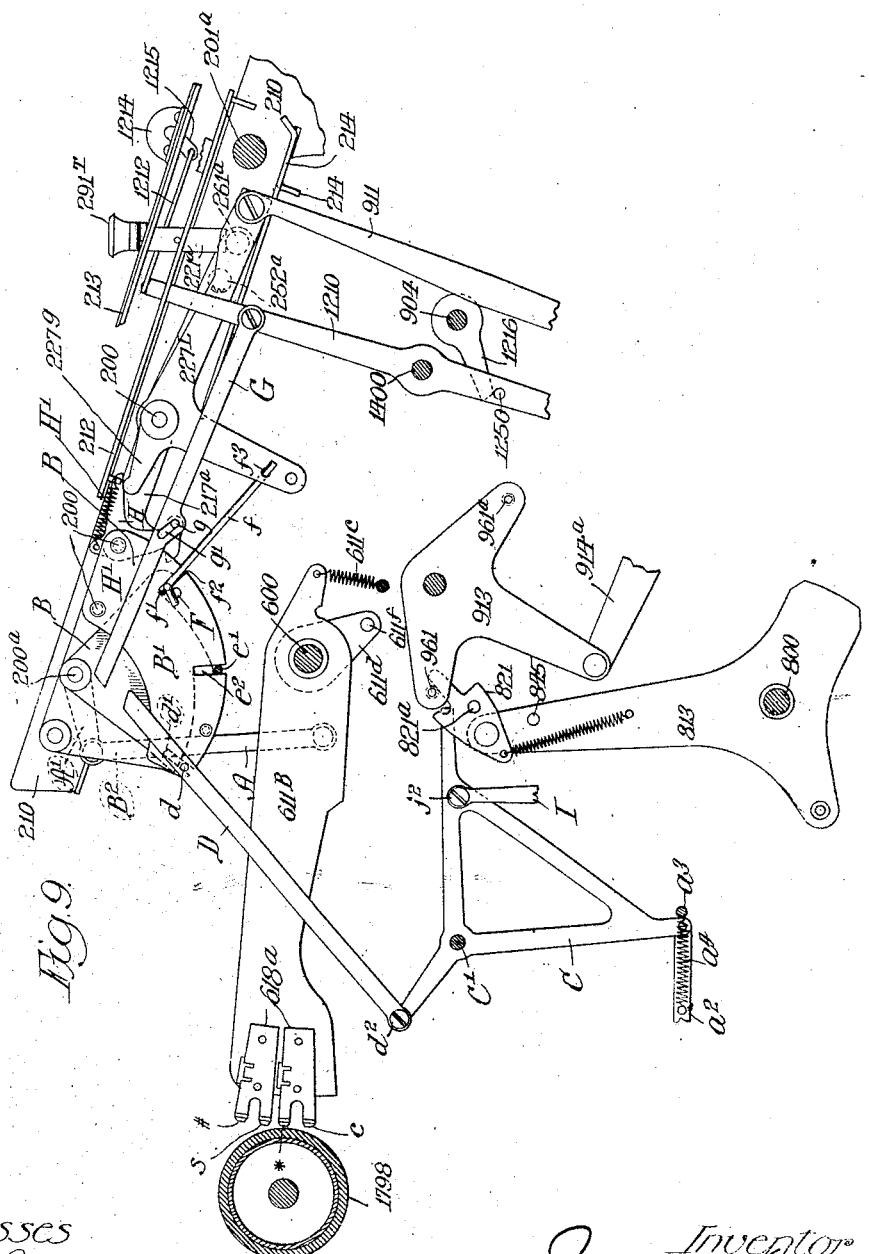

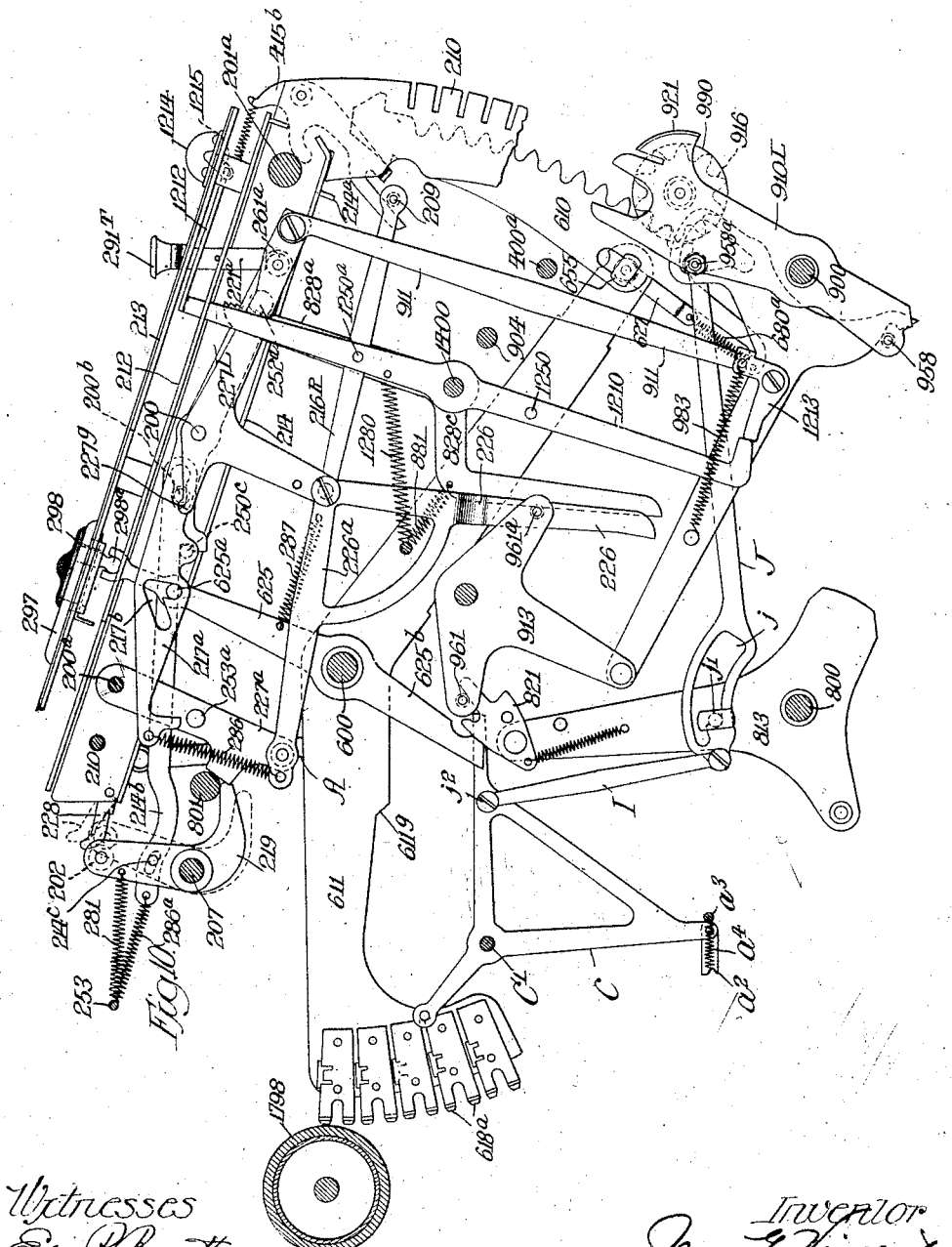

J. G. VINCENT.
ADDING MACHINE.
APPLICATION FILED SEPT. 24, 1906.
1,043,882.
Patented Nov. 12, 1912.
13 SHEETS—SHEET 11.
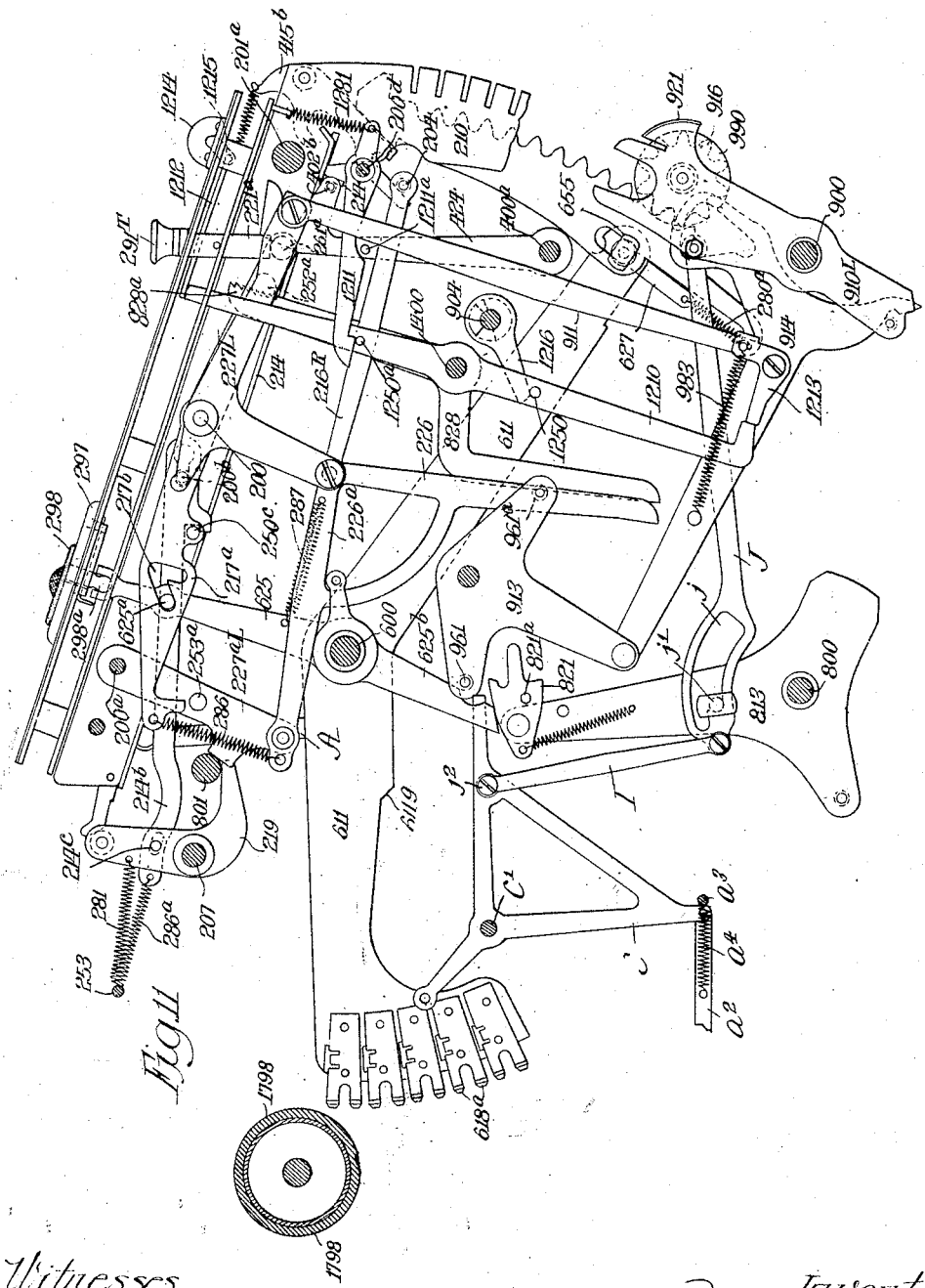

J. G. VINCENT.
ADDING MACHINE.
APPLICATION FILED SEPT. 24, 1906.
1,043,882.
Patented Nov. 12, 1912.
13 SHEETS—SHEET 12.
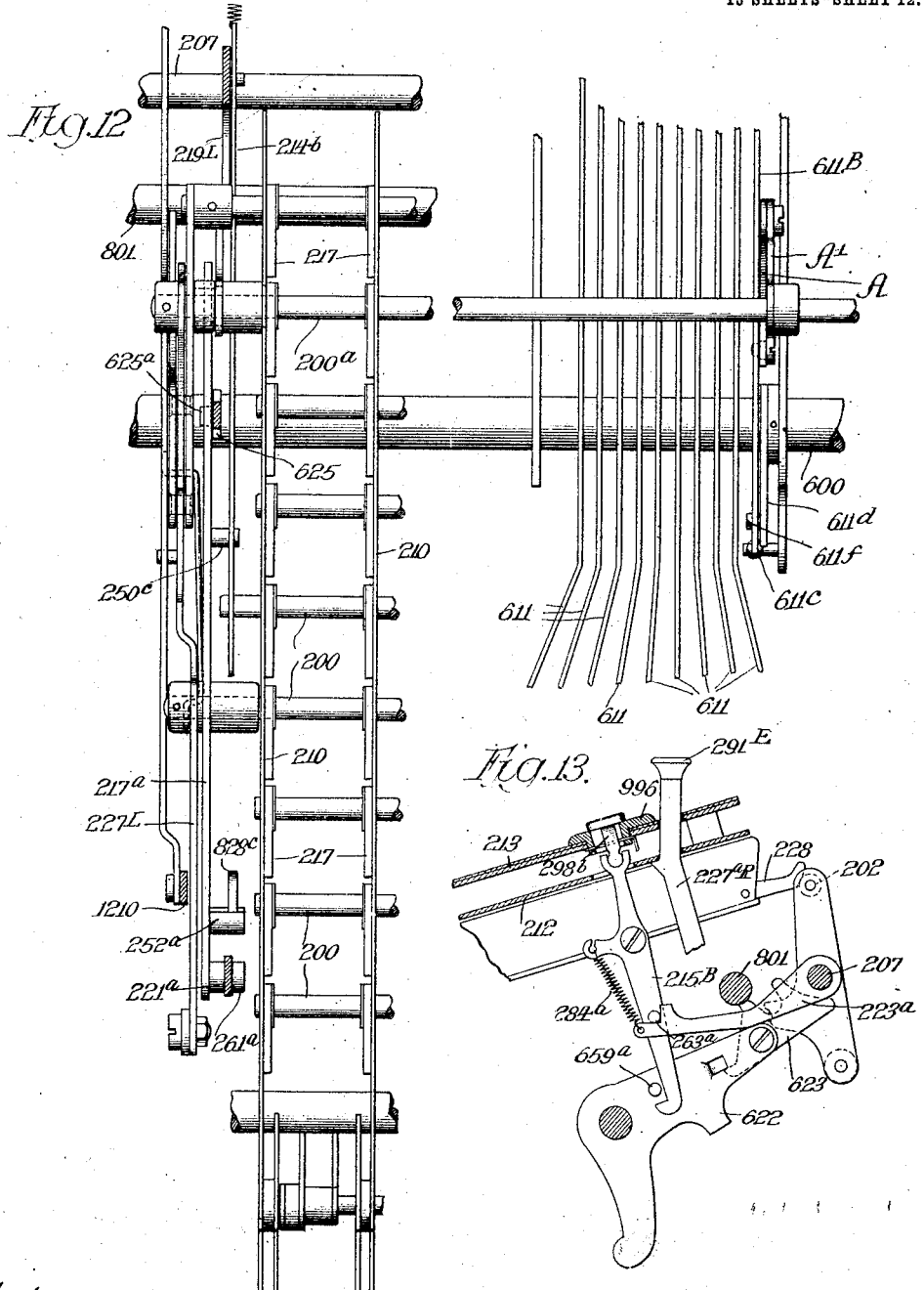
Witnesses:
Edw. P. Barrett
Louis B. Erwin
Inventor
Jesse G. Vincent
By Rector Hibben Davis
his Attys.

J. G. VINCENT.
ADDING MACHINE.
APPLICATION FILED SEPT. 24, 1906.

1,043,882.

Patented Nov. 12, 1912.

*Fig 15.*

```
723468754 #
    6900032 #
  432006870 #
    3210000 #
   65434500 #
   78900876 #
     246800 #
    7865432 #

3690210 #
   68903404 #
  404050607 #
  708090807 #
  706543200 #
  321003210 #
```

```
   78901234 C
    6543210
   43654321
   21043201
   65432100
   85467890
   78906789
   85432167

465380912 S 65432100
    3690230
   43567890
   36903456
   56789010
   36789000

709552598 *
```

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,043,882.  Specification of Letters Patent.  Patented Nov. 12, 1912.

Application filed September 24, 1906. Serial No. 335,961.

*To all whom it may concern:*

Be it known that I, JESSE G. VINCENT, a citizen of the United States, residing at Detroit, in the county of Wayne and State of Michigan, have invented certain new and useful Improvements in Adding-Machines, of which the following is a specification.

One object of the present invention is to provide in an adding machine for the automatic characterizing of items so as to distinguish between those which are accumulated or added and those which are not, also to distinguish the first item of a list of added or accumulated items and to distinguish subtotals and grand totals from each other and from other printed items.

A further object of the invention is to provide a visual signal showing the condition of the machine as to accumulation of items therein, which signal, having been set by "clearing" operation *i. e.* by the taking of a grand total to indicate that there is no accumulation in the machine, will not be affected by the setting up on the keyboard of an amount and the printing of such amount without accumulation thereof. It is of course well known that in various kinds of listing and tabulating work performed upon an adding machine occasion frequently arises for printing a designating number which forms no part of any computation which the machine is to work out.

The invention also aims to provide a new form of connections for controlling the taking of totals, such connections not being adjusted as heretofore by finger pressure but being arranged to shift automatically, as by spring pressure, so that only a light touch is necessary upon the key or other manipulating device or devices. A minor object in this same connection is to improve the form of manipulating means by employing slide keys in place of depressible keys, thereby making the keyboard somewhat more compact and sightly.

In adding machines it is customary to employ what is termed a repeat key by whose manipulation an amount may be caused to remain set up indefinitely on the keyboard while the machine is operated as many times as desired. It is also customary to employ what is termed an error-key, whereby wrongly depressed keys may be released without operating the machine. By the present invention it is proposed to provide for automatically latching the repeat key in effective position and unlatching it by the use of the error-key. Thus effective positioning of the repeat key is made possible without requiring more than its mere thrust or displacement in a single direction, *i. e.*, without requiring compound movement as *e. g.*, first depressing and then rocking such key which latter manner of manipulation has been heretofore practised. Furthermore the above mentioned new arrangement provides for convenient restoration of the repeat key to normal without requiring an extra key for such purpose which would otherwise be necessary in view of the automatic latching of the repeat key.

In the well-known Burroughs type of adding machine, to which the present invention more particularly relates, the accumulator stands normally in operative relation to its actuating devices and in an itemizing operation the accumulator and its actuators first separate and the actuators take up positions determined by the amount keys depressed, after which in the continued operation of the machine the accumulator and its actuators are brought together again so that in the restoration of the actuators to normal the accumulation will be effected.

In order to avoid the possibility of the accumulator and its actuators not coming together soon enough it is proposed by the present invention to provide for this connection taking place at the end of the initial stroke of the prime mover of the machine, so that the operative relationship between the accumulator and actuators must of necessity exist before any return of the actuators toward normal can be started. In this connection provision is made for disabling the means for bringing together the accumulator and actuators when an item or number set up on the keyboard is not to be added or accumulated.

With the above enumerated and incidental objects in view the invention consists in certain novel features of construction and combinations of parts, the essential elements whereof are recited in the appended claims and a preferred form of embodiment of which is described in detail hereinafter and fully illustrated in the accompanying drawings forming part of this specification.

Of said drawings, Figure 1 represents a top plan view of an adding machine having the improvements of the present invention, some parts being broken away to disclose others below them; Fig. 2 represents in right side elevation the interior working parts of the machine at normal, the casing and cross shafts and rods appearing in section, as likewise the laterally shifting paper carriage mechanism at the rear; Fig. 3 is a similar view from the left hand side of the machine; Fig. 4 represents some of the interior working parts of the machine in left side elevation illustrating their relative positions in adjustment for printing but not adding or accumulating an item at a time when the accumulator stands at zero and the prime mover is at the end of its initial stroke; Fig. 5 is a somewhat similar view but showing more of the working parts, and illustrating them relatively positioned as when the first of a series of added or accumulated items has been set up on the keyboard and the prime mover has reached the end of its initial stroke; Fig. 6 shows the same parts as illustrated in Fig. 5, but relatively positioned as when a following item to be accumulated has been set up on the keyboard and the prime mover is at the end of its initial stroke; Fig. 7 shows the same parts illustrated in Fig. 4 but relatively positioned as when an item not to be added has been set up on the keyboard and an accumulation is present in the machine the prime mover is at the end of its initial stroke; Fig. 8 is a view similar to Figs. 4 and 7 but showing less parts, this view illustrating the relative positioning of parts when a subtotal adjustment has been made and the prime mover is at the end of its initial stroke; Fig. 9 is a similar view illustrating the relative positioning of parts when a grand total adjustment has been made and the prime mover is at the end of its initial stroke, some parts shown in Fig. 8 being omitted and others not appearing in Fig. 8 being illustrated; Fig. 10 represents a right side elevation of interior working parts of the machine, many of which parts are beyond those illustrated in Figs. 4 to 8, this view showing the relative position of parts when the grand total key has been touched and the prime mover is at the end of its initial stroke; Fig. 11 is a similar view showing relative positioning of parts when the subtotal key has been operated; Fig. 12 is a fragmentary top plan view showing devices immediately below the keyboard of the machine; Fig. 13 represents in right side elevation certain parts which similarly appear in Fig. 2 but under a different adjustment; and Fig. 14 is a perspective detail of a certain lost motion device; and Fig. 15 shows an example of work such as the machine is adapted to perform.

The invention is by preference illustrated and described as applied to the well known Burroughs adding machine, whose construction and mode of operation can be ascertained by consulting the William S. Burroughs patents Nos. 504,963 and 505,078, issued September 12, 1893. The disclosure in this and other patents and the extensive use of the machine on the market makes it unnecessary to enter into a detailed description here of all of its accustomed mechanism and the particular manner of performance of its various familiar functions. Therefore only such elements in this machine will be specifically referred to as need to be considered for a thorough understanding of the construction and mode of operation of the various improvements of the present invention.

The reference numeral 291 designates the usual rows of numbered keys the depression of which sets stops to limit the extent of movement of racks 610 carried at the forward end of levers 611 independently pivoted upon a cross shaft 600 and extending in rear thereof to carry sets of numeral type 618ª. In an operation of the machine type are presented to a roller platen 1798 and by suitable hammer mechanism such as described in said Patent #505,078 driven against an ink ribbon through which an imprint is made upon paper overlying said platen. The latter is suitably supported in a laterally movable carriage, the details of which need not be described except as to certain devices hereinafter pointed out which perform the function of preventing coöperation between the racks 610 and the register or accumulator when it is desired to print an amount or number without adding it. Said accumulator comprises pinions 916 to mesh with said racks and number wheels or disks 990 compounded respectively with said pinions. This accumulator is as usual carried in the upper part of a rocking frame 910 pivotally supported upon a cross rod 900 and extending below the same. A pitman 914 is adapted to engage this frame alternately above and below its pivot, said pitman taking the shape of a triangular frame in an upstanding portion which embraces a stud 958ª on said accumulator frame, and having a depending branch for engagement with another stud 958 on the accumulator frame. Normally the stud 958ª seats in the contracted lower part of the triangular portion of the pitman so that reciprocations of the latter will produce reciprocations of the accumulator frame.

Reciprocations of the pitman are produced through the medium of a three-armed lever 913 with which it is connected, forwardly and rearwardly extending arms of said lever having studs 961ª and 961 against which a wipe pawl 821 operates. This pawl is mounted on the upper end of an arm 813 secured to a rock shaft 800 which is oscillated in each operation of the machine. Said rock shaft is connected in a well known manner with a rock shaft 100 which is in turn connected through a link 366 with a sector plate 311 secured to a suitable shaft 300 to which it is customary to apply an operating crank handle 368$^a$. An operation of the machine is brought about by drawing forward this crank handle to the limit and then releasing it when springs operate in a well known manner to return the parts to normal. In an itemizing operation the accumulator is rocked out of engagement with the rack 610 at the outset and remains so while the racks drop during the drawing forward of the crank handle. Then when said handle is released the accumulator is drawn into mesh with the racks and the return of the latter to normal position releases the number wheels or disks of the accumulator.

One of the improvements of the present invention provides for the accumulator being moved into mesh with the racks at the end of the forward stroke of the handle instead of at the commencement of its rearward stroke and to this end a link J is coupled at its forward end to the stud 958$^a$ and is formed at its rear end with a slot $j$ which embraces a stud $j'$ on the arm 813. The lower half of this slot is of such longitudinal extent as to cause said stud $j'$ to act against the rear end of this portion of the slot as the arm nears the end of its rearward stroke which corresponds with the forward stroke of the operating handle. Thus the accumulator frame will be rocked rearward and the accumulator brought into mesh with the racks at desired time. The upper half of said slot is made sufficiently longer than the lower half to provide for preventing such rearward rocking of the accumulator by lowering the rear end of the link J so as to bring the stud $j'$ into this elongated portion of the slot. This is done when an amount or number is to be printed but not added. This depression of the rear end of the link is accomplished in the present instance through the medium of a link I jointed at its lower end to the link J and at its upper end to the forwardly extending arm of a bell crank lever C. This arm of said lever projects forward over the path of movement of a stud 821$^a$ on the wipe pawl 821 so that when lowered it will operate to prevent effective engagement between said pawl and the stud 961, thus disabling this pawl as a means for rocking the accumulator into mesh with the racks. The means here shown for lowering said arm of the bell crank lever comprise a link $a^2$ jointed to the depending arm of said lever and extending rearward through the back of the machine casing and there joined to the transversely disposed lever $a'$ (Fig. 1) pivoted intermediate its ends upon a bracket on the casing. The laterally movable paper carriage carries a rod 1704 on which are secured a number of stop-fingers 1792 for determining in conjunction with a fixed abutment 1716 the lateral position of the carriage and wherever desired these stop fingers may be equipped with detachable roller studs 1744$^a$ for contact with a cam nose formed at one end of the lever $a'$. The movement of the paper carriage to a position where printing is to be done without accumulation causes the rocking of said lever by the action of one of the roller studs 1744$^a$ against said cam nose and this rocking of the lever draws rearwardly the link $a^2$ and consequently the depending arm of the bell crank lever C, of course resulting in depression of the horizontal arm of the same. The bell crank lever is normally held forward against a stop pin $a^3$ by a spiral spring $a^4$ connecting said stop pin with the link $a^2$.

It is customary in the Burroughs machine to establish an adjustment for taking a total by depressing the forward end of the pitman 914$^a$, thus bringing the widened upper portion of the triangular part thereof about the stud 958$^a$ and thereby preventing the ensuing forward thrust of the pitman from disengaging the accumulator and racks. At the same time the depending branch of the pitman is brought into coöperative relation with the lower stud 958 so that when the pitman is drawn rearwardly the accumulator will be disengaged from the racks and remain at zero. This adjustment is usually brought about through pressure applied to a key at the left hand side of the keyboard. The present invention provides for the adjustment being brought about through the action of a spring, the key merely operating to trip a latch and permit the spring to work. The usual link 911 is coupled at its lower end to the pitman and at its upper end to the forwardly extending arm of a bell crank lever 227$^L$ secured to a rock rod 200 extending across the machine. Said lever has a depending arm and there is secured to the opposite end of said rock rod (see Fig. 2) a similar arm 227$^R$. To the lower ends of these two arms are coupled links 216$^L$ and 216$^R$ supporting between them at their forward ends a rod 209 for tripping the latches 415$^b$ to release the racks 610 in the usual manner.

The depending arm of the bell crank lever 227$^L$ is further coupled at its lower end to the forward end of a link 226$^a$ drawn rearwardly by a spiral spring 287, which thus tends to rock the bell crank 227$^L$ and establish the adjustment for taking totals. The rear end of the link 226$^a$ is jointed to the lower end of an arm 227$^a$ swinging from a cross rod 200$^a$ and abutting against a cross rod 801 under the stress of said spring 287.

A latch lever 217ᵃ pivoted on the cross shaft 200 is formed at its rear end to engage a stud 253ᵃ on said arm 227ᵃ and thereby hold the same and its connections forward to preserve the itemizing adjustment of parts against the stress of said spring 287. The total key 291ᵀ slides freely in suitable guides in the supporting plates of the keyboard and rests at its lower end upon a stud 261ᵃ of said latch lever. Thus by touching this total key said latch lever may be rocked to disengage its rear end from the stud 253ᵃ against the stress of a spring 286 connecting the latch lever with the link 226ᵃ. This does not, however, immediately result in the adjustment of the parts for taking a total, for the reason that said link 226ᵃ has a depending arm 226 which normally abuts against a stud 845 on the oscillatory arm 813 as shown in Fig. 3. Therefore the machine must start to operate before the total adjustment is established. Of course as the said arm 813 moves rearwardly said depending arm 226 of the link 226ᵃ will follow up the stud 845 and the total adjustment will then be assumed and maintained during the machine's operation.

In order to hold the latch lever displaced without requiring continued pressure of the total key a latch bar 214ᵇ is mounted to slide upon a cross rod 200ᵇ and engage a stud 250ᶜ on the latch lever. This latch bar is drawn rearwardly by a spring 286ᵃ tending to enforce its locking engagement with said stud, but normally the stud bears against a portion of the latch bar below the stud-engaging notch thereof, as shown in Fig. 3. Immediately upon the rocking of the latch lever by the touch on the total key the latch bar springs rearwardly to hold the latch lever and prevent its re-engagement with the stud 253ᵃ. The rear end of the latch bar is slotted to engage a stud 214ᶜ on one of the side bars 219 of the usual Burroughs key detent displacing bail 219. This bail, as well understood by those familiar with the Burroughs construction is rocked forwardly at the conclusion of an operation to displace detents 228 which hold the amount keys depressed. Through a slot-and-pin connection with the latch bar 214ᵇ this rocking of the bail is availed of to thrust forward the latch bar and release the latch lever 217ᵃ at the conclusion of an operation of the machine when the stud 845 has restored the total connections to normal by moving forward the link arm 226. It is desirable to prevent any depression of the total key or displacement of the latch lever after the machine has started to operate and to this end said latch lever is provided with a stud 252ᵃ having a short series of downwardly pointed teeth on its rear side for engagement with upwardly pointed teeth in the front edge of the upper arm 828ᵃ of a lever pivoted upon a cross shaft 1400 and having a rearwardly and downwardly extending arm 828 adapted to be engaged by the stud 845. Normally an engagement of said stud with said lever holds the same against the tension of the spring 881 (Fig. 3) so that the toothed upper arm of the lever is held away from the stud 252ᵃ but immediately upon the removal of said stud 845 from engagement with the lever when the machine starts to operate, the toothed upper end of said lever interlocks with the toothed rear side of the stud 252ᵃ, absolutely preventing any depression of the total key.

It has been customary in the use of a Burroughs adding machine to bring about the printing of what is commonly termed a subtotal by releasing the total key at the conclusion of the forward stroke of the operating handle so as to prevent action of the depending branch of the pitman 914ᵃ upon the stud 958, thus causing the accumulator to remain in mesh with the racks and to have its accumulation restored. By the present invention the adjustment of parts for taking a subtotal is brought about through manipulation of a separate key from that used when causing adjustment for the taking of a grand total. In the present instance this key takes the form of a slide piece 298 near the upper left hand corner of the keyboard adapted to be moved back and forth in a suitable slideway provided by a plate 297 secured upon the keyboard. This slide piece has a stud 298ᵃ projecting through a slot in the upper plate 213 of the keyboard and rounded at its lower end to seat in a socket formed at the upper end of a lever 625 pivotally mounted upon the cross shaft 600. This lever has a stud 625ᵃ occupying an angular slide 217ᵇ in the latch lever 217ᵃ. Normally the vertically extending portion of this slot is in line with the stud and the latter occupies the upper portion of the same so that the latch lever may be freely rocked by a touch upon the total key to produce the result hereinbefore described and to lock the subtotal key against operation by reason of the lower portion of said vertical part of the slot passing into engagement with the stud as illustrated in Fig. 10. However, the upper portion of this vertical part of the slot also forms the forward portion of the oblique part of the slot. Therefore, with parts in normal position, by pushing the subtotal slide piece 298 rearwardly the stud 625ᵃ is caused to act upon the upper side of this oblique part of the slot and thereby displace the latch lever, producing the same effect as a touch upon the total key in releasing or unlatching the connections for depressing the forward end of the pitman 914ᵃ. This rearward movement of the subtotal slide does more, however, for it is necessary to disable the means whereby in the taking of a grand total the accumulator is disengaged from the racks during the return of the latter to normal. The lever 625 is provided with a depending arm 625ᵇ, whose lower extremity normally marks the rearward limit of travel of the wipe-pawl 821. The movement of the lever produced by sliding the subtotal key rearwardly causes this lower extremity of the depending arm of the lever to advance and take up a position where said wipe pawl will encounter it. The result is to tilt said wipe pawl forward and prevent its engagement with the stud 961 as shown in Fig. 11, so that when the arm 813 moves forward no rocking of the three-armed lever 913 will take place and consequently the accumulator will remain in mesh with the racks.

In Burroughs machines heretofore known a visual signal has been employed to show the operator whether or not there is an accumulation of amounts in the machine or in other words whether the machine is clear with the accumulator standing at zero. The similar signal devices shown in the present case *per se* constitute no part of the present invention but a description of them will be necessary as to certain novel character printing devices operated in connection therewith. Within a casing 1214 at the lower left hand part of the keyboard is arranged a suitable plate showing through an opening in said casing and bearing the word "Clear" or other suitable designation and also an indicating characteristic to show the opposite condition of the machine, as for example a bar of red. This plate is pivotally mounted and provided with a depending crank arm 1215 connected by a link 1212 with the upper end of an arm 1210 pivoted intermediate its ends upon the cross rod 1400. The upper part of this arm is normally held forward against the stress of a spring 1280 (Fig. 3) by a latch 1211 pivotally mounted upon a cross rod 200ᵃ and normally depressed by a spring 1281. Detent bars or strips 214 which are moved rearwardly by depression of amount keys in the well-known manner have depending lips 214ᵃ acting upon a cross rod 402ᵇ of a bail comprising side bars 424ᴸ and 424ᴿ pivotally mounted upon a cross rod 400ᵃ. The said bar 424ᴸ has a stud 1211ᵃ to act upon a cam edge of the latch 1211 so as to lift the latter whenever an amount key is depressed. This is for the purpose of releasing the arm 1210 so that it may shift the signal and display the red portion thereof indicative of the presence of an accumulation. However, this shifting does not take place immediately upon the depression of an amount key when the first of a series of items is set up on the keyboard, for said arm is further restrained by the abutment of a stud 1250 thereof against the end of an arm 1216 on a rock shaft 904. This arm is formed with a hub portion having a semi-circular clutch member 1216ᵃ as shown in Fig. 14 and there is secured to said rock shaft a collar 1216ᵇ with a similar clutch member 1216ᶜ slightly less than semi-circular so as to provide for lost motion between it and the clutch member 1216ᵃ. A spring 1281ᵃ holds these clutch members in contact on the forward side of the shaft but it will be seen that the arm 1216 may be held back against the stress of said spring while the shaft continues to turn to some extent. Said shaft carries an arm 918ᵇ, see Fig. 2, which is adapted to be struck by a roller stud 339 on an upwardly extending arm 311ᵇ of the sector plate 311 at the end of the forward stroke of the operating handle. Thus rocking of the shaft 904 is produced in a direction to elevate the arm 1216 out of engagement with the stud 1250 whereupon the arm 1210 may rock to change the signal.

The restoration of the arm in the taking of a grand total is brought about through the rearward movement of the pitman 914 when depressed. The pitman carries a pivoted abutment piece 1213 with a lateral lip engaging the forward edge of the link 911 to limit the action of a spring 983 which operates to maintain said abutment piece in position to act against the forwardly turned lower end of the arm 1210. During the accumulation of items and subsequent to the putting in of the first item the arm 1216 rests on top of the stud 1250 and when the rock shaft 904 returns to normal as the stud 339 leaves the arm 918ᵇ the spring 1281ᵃ yields. Upon the shifting of the arm 1210 by the abutment piece 1213 this stop arm 1216 resumes its normal position in front of the stud 1250 and of course the latch 1211 drops over the stud 1250ᵃ. During the itemizing subsequent to the putting in of the first item said latch 1210 simply rests in rear of its shoulder upon said stud as shown in Fig. 6.

As heretofore stated it is one of the purposes of the present invention to provide for characterizing different items and this is done by printing in association therewith certain special characters such, for example, as a star to designate a total, the letter "s" to designate a subtotal, the letter "c" to designate the first of a series of accumulated items, and the number sign to indicate an unaccumulated item. The devices whereby the setting of a type carrier to produce the proper imprint is brought about coöperate with the above described visual signal mechanism. The character type carrier is in the form of a bar 611ᵇ pivotally mounted upon the cross shaft 600 and held normally depressed as to its rear end by the engagement with its forward extension of a stud 611ᵈ secured to said shaft 600 which is a well known rock shaft of the Burroughs machine. A spring 611ᶜ secured to said forward extension of the type bar tends to elevate the rear end of the latter. At its rear end this bar carries type plates 618ᵉ having type to print the above mentioned characters but normally the bar is positioned with all of the type below the printing line. This bar has a cam edge 611ᵍ similar to the customary cam edge on the regular type lever 611 of a Burroughs adding machine and designed to operate in the same manner for disabling the hammer mechanism when the type bar is in normal position and permit an operation of such hammer mechanism as soon as the bar is moved from normal position and one or another of its type brought to the printing line. This bar is connected through the medium of a link A with a crank arm A' secured to a sleeve on the cross rod 200ᵃ, said sleeve carrying a segment B having three steps or shoulders B³, B⁴, B⁵. The said segment is guided between suitable plates B' slotted as shown at $d'$ $e^2$ $f^3$ for the guidance of pins $d$, $e'$, $f'$ respectively, the latter designed to constitute stops for determining the extent of movement of the segment by the abutment of the steps of the latter against said pins respectively. The stop pin $d$ is carried by a bar D, which is jointed to an arm of the bell crank lever C and hence is set in position whenever a number is to be printed but not accumulated. The stop pin $e'$ is formed by the bent end of a rod or wire $e$ which is connected with an arm E compounded with the subtotal lever 625 and hence this stop pin moves into effective position whenever the subtotal key is operated. The stop pin $f'$ is formed by the bent end of a rod or wire $f$ which is connected with the depending arm of the bell crank lever 227ᴸ, and consequently takes up its effective position whenever the grand total key is depressed. This latter stop will of course be moved into effective position also when the subtotal key is depressed, but the step B⁴ of the segment reaches the stop pin $e'$ before the step B³ can reach the stop pin $f'$. The abutment of the stepped segment against one or another of the above described stop pins results in positioning the type bar 611ᵇ for printing either the subtotal, grand total or unaccumulated item characters. The position of said type bar for printing the first of a series of accumulated items is brought about by the abutment of the step B³ against a fixed stud F supported between the guide plates B'. For maintaining the type bar in normal position during the printing of subsequent accumulated items a latch H is employed to engage said step B³ as enforced by a spiral spring H'. This latch has a forward extending arm lying over a rearward extension 227ˢ of the bell crank lever 227ᴸ and the depending part of the latch carries a stud $g$ occupying an oblique slot G' in a bar G pivoted at its forward end to the upper part of the signal arm 1210 and extending at its rear end in proximity to the upper end of the bar G. Normally, that is when the machine is clear, the said latch is withdrawn from a position where it can operate to obstruct the segment. This is because the upper part of the signal arm is drawn forward and the rear end of the oblique slot $g'$ is against the stud $g$, see Fig. 3.

In the case of a number being set up on the keyboard and the machine operated with the accumulator connections disabled, the latch is maintained out of position for engagement with the segment by reason of the fact that the bar D is thrust across the rear end of the bar G, see Fig. 4. It will be noted that this also has the effect of preventing the signal arm from rocking and hence preserving the signal at the "clear" adjustment. In the case of the first item or amount to be added the rocking of the signal arm and the consequent rearward movement of said bar G will permit the latch H to be moved rearwardly by its spring H', but prior to the rocking of the signal arm the segment B has moved rearward, carrying its step B³ past the latch as shown in Fig. 5, said step coming against the fixed pin F. The forward upper edge of the segment is rounded off and the under rear edge of the latch is correspondingly rounded so that as the type bar is restored to normal at the conclusion of the machine's operation the segment will push the latch forward against the stress of the latter's spring and then the latch will snap under the step B³ as soon as the same passes the engaging shoulder of the latch. This condition then obtains during the accumulation of subsequent items. In the case of a number being printed without accumulation after one or more items or amounts have been accumulated and before any clearing operation, the latch will be displaced by reason of the bar D being thrust against the under side of the bar G and the resulting coaction of cam slot $g'$ and stud $g$ as illustrated in Fig. 7, whereupon in the ensuing operation the type bar may rise to the proper position for printing the character indicating an unaccumulated item. In the case of a subtotal the latch is displaced by the action of the rearward extension 227ˢ of the bell crank 227ᴸ against the tail of the latch, as shown in Fig. 8. This also takes place when a grand total is to be printed and in such operation the signal arm is rocked as heretofore explained so that the bar G is drawn forward and the latch further restrained by engagement of the rear end of the oblique slot $g'$ with the stud $g$.

It will be understood that in every operation of the machine the stud 611ᶠ is swung back and forth so as to first free the special type bar and then restore the same to normal position in case it has been moved to any one of its printing positions.

Referring next to the means for latching the repeat key and releasing the same by the error key, the reference numeral 291ᴱ designates the latter key which is mounted upon the upper end of a depending bar or stem 227ᵃ arranged to slide vertically through the keyboard plates. The lower end of this bar is bifurcated (see Fig. 2) to straddle a stud 258ᵃ on a forwardly extending arm of the bail 219. A spring 281 holds this error key normally elevated and it will be obvious that the depression of said key against the stress of this spring will rock the bail 219 and release any depressed keys in the usual manner. The similar rocking of this bail which takes place automatically at the conclusion of an operation of the machine is produced through the usual means comprising an arm 622 loosely mounted upon the shaft 600 and carrying a spring-drawn wipe-pawl 623 to act against a roller on the bail 219, said arm being drawn downwardly by the same spring 681 which acts on said pawl and moved upwardly by the action against its depending portion of an arm 312 compounded with the sector 311. The machine is adjusted for repeating the addition of an item by disabling this arm 622. The means provided by the present invention for so doing comprise a latch lever 215ᴮ pivoted intermediate its length and formed at its lower end as a hook to take under a stud 659ᵃ on said arm 622. The upper end of this lever is formed as a socket to receive the rounded end of a stud 298ᵇ, said stud being part of a slide key 298 fitted to a slotted guide plate 296 at the upper right hand part of the keyboard. A spring 284ᵃ is secured at one end to a forward projection of the lever 215ᴮ and at the opposite end to a latch arm 223ᵃ pivoted upon a cross rod 207 of the bail 219. Normally a stud 263ᵃ of the lever 215ᴮ bears against the top of the latch lug 223ᵇ of said latch arm 223ᵃ, the repeat key 298 being held in its forward position and the lower end of the lever 215ᴮ consequently in its rearward position by the spring 284ᵃ. Under these conditions the operations of the machine are not affected by the repeat devices. When it is desired to prepare the machine for repeating, the slide key 298 is pushed rearwardly and thus the lower hooked end of the lever 215ᴮ brought forward into position for engagement with the stud 659ᵃ (see Fig. 13). The stud 263ᵃ moves off the top of the lug 223ᵇ and the latch arm 223ᵃ springs up projecting said lug behind said stud and thus latching the repeat lever in its operative position. In this manner the repeat key is automatically held in operated position and requires no manipulation by the operator for such purpose. When the requisite number of repeat operations have been performed the depression of the error key 291ᴱ results in restoring the repeat key to normal position. To this end the error key stem 227ᵃ is provided with a stud 223ᶜ overlying the latch arm 223ᵃ so that when the error key is depressed this stud will displace said latch arm carrying its lug 223ᵇ below the stud 263ᵃ whereupon the spring 284ᵃ returns the repeat lever and key to normal positions.

While the improvements of the present invention have been described as applied to the well-known Burroughs type of adding machine it is to be understood that the invention is not necessarily limited to such particular application and that the form of means for carrying it out may be variously modified without departing from the spirit and scope of the invention.

What is claimed is:

1. In a machine of the character described, the combination of an accumulator, means for actuating the same, and item and total printing mechanism, means for preventing at will actuation of the accumulator, and means automatically operated for differently characterizing printed first items, unaccumulated items, totals and sub-totals.

2. In a machine of the character described, the combination of an accumulator, means for actuating the same, and item and total printing mechanism, means for preventing at will actuation of the accumulator, means for denoting whether or not the accumulation is preserved after the printing of a total, and automatically operated means for differently characterizing printed first items, unaccumulated items, totals and sub-totals.

3. In a machine of the character described, the combination of an accumulator, means for actuating the same, and item and total printing mechanism, a type-carrier with type for characterizing first items, unaccumulated items, total amounts and sub-total amounts respectively, and means for variously positioning said carrier automatically to bring one or another of said type into position for printing according to the work the machine is performing at the time.

4. In a machine of the character described, the combination of an accumulator, means for actuating the same, and item and total printing mechanism, means for preventing at will actuation of the accumulator, means for denoting whether or not the accumulation is preserved after the printing of a total, a type-carrier with type for characterizing first items, unaccumulated items, total amounts and sub-total amounts respectively, and means for variously positioning said carrier automatically to bring one or another of said type into position for printing according to the work the machine is performing at the time.

5. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing imprints to distinguish between first items accumulated, following items accumulated, unaccumulated items, totals and sub-totals.

6. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and a type-carrier controlled by said devices and having type for characterizing imprints to distinguish between first items accumulated, following items accumulated, unaccumulated items, totals and sub-totals.

7. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; means for denoting whether or not the accumulation is preserved, printing mechanism working in coöperation with the accumulator; and means for characterizing imprints to distinguish between first items accumulated, following items accumulated, unaccumulated items, totals and sub-totals.

8. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; means for denoting whether or not the accumulation is preserved, printing mechanism working in coöperation with the accumulator; and a type carrier controlled by said devices and having type for characterizing imprints to distinguish between first items accumulated, following items accumulated, unaccumulated items, totals and sub-totals.

9. In a machine of the character described, the combination with accumulating and item and total printing mechanisms; of means for automatically and as incidental to item or total printing operations characterizing certain of the imprints comprising a differentially movable type carrier and a set of stops to determine the different positions assumed by the latter for differently characterizing the imprints.

10. In a machine of the character described, the combination with accumulating and item and total printing mechanisms and operating means therefor; of means for automatically characterizing certain of the imprints comprising a spring-impelled type carrier normally restrained by said operating means, and a set of stops to differentially limit the movement of said carrier when freed from such restraint.

11. In a machine of the character described, the combination with accumulating and item and total printing mechanisms and operating means therefor; of means for automatically characterizing certain of the imprints comprising a swinging bar carrying a set of type and spring-impelled in a direction to move said type to the printing line but normally restrained by said operating means with the foremost type withdrawn from such line, and a set of stops to differentially limit the movement of said bar when freed from such restraint.

12. In a machine of the character described, the combination with accumulating and item and total printing mechanisms and operating means therefor; of means for automatically characterizing certain of the imprints comprising a spring-impelled type carrier normally restrained by said operating means, a swinging stepped segment operatively connected with said carrier, and a set of stops coöperating with said segment to differentially limit the movement of said carrier when free from such restraint.

13. In a machine of the character described, the combination with accumulating and item and total printing mechanisms and operating means therefor; of means for automatically characterizing certain of the imprints comprising a spring-impelled type carrier normally restrained by said operating means, a swinging stepped segment operatively connected with said carrier, and a set of stops adapted to be severally presented to the segment's steps respectively to differentially limit the movement of said carrier when free from such restraint.

14. In a machine of the character described, the combination with accumulating and item and total printing mechanisms and operating means therefor; of means for automatically characterizing certain of the imprints comprising a swinging bar carrying a set of type and spring-impelled in a direction to move said type to the printing line but normally restrained by said operating means with the foremost type withdrawn from such line, a swinging stepped segment operatively connected with said bar, and a set of stops, coöperating with said segment to differentially limit the movement of said bar when freed from such restraint.

15. In a machine of the character described, the combination with accumulating and item and total printing mechanisms and operating means therefor; of means for automatically characterizing certain of the imprints comprising a swinging bar carrying a set of type and spring-impelled in a direction to move said type to the printing line but normally restrained by said operating means with the foremost type withdrawn from such line, a swinging stepped segment operatively connected with said bar, and a set of stops adapted to be severally presented to the segment steps respectively to differentially limit the movement of said bar when free from such restraint.

16. In a machine of the character described, the combination with accumulating and item and total printing mechanisms; of means for automatically characterizing certain of the imprints comprising a normally restrained spring-impelled type carrier, a swinging stepped segment operatively connected with said carrier, a fixed stop to measure the maximum movement of the segment by presenting an abutment to one of the steps, and one or more movable stops to measure lesser degrees of movement of the segment; substantially as and for the purpose described.

17. In a machine of the character described, the combination with accumulating and item and total printing mechanisms; of means for automatically characterizing certain of the imprints comprising a swinging bar carrying a set of type and spring-impelled in a direction to move said type to the printing line but normally restrained with the foremost type withdrawn from such line, a swinging stepped segment operatively connected with said bar, a fixed stop to measure the maximum movement of the segment by presenting an abutment to one of the steps, and one or more movable stops to measure lesser degrees of movement of the segment; substantially as and for the purpose described.

18. In a machine of the character described, the combination with accumulating and item and total printing mechanisms; of means for automatically characterizing certain of the imprints comprising a normally restrained spring-impelled type carrier, a latch for preventing movement of the carrier in accumulating operations of the machine, and stops for determining the extent of movement of said carrier in other operations of the machine.

19. In a machine of the character described, the combination with accumulating and item and total printing mechanisms; of means for automatically characterizing certain of the imprints comprising a swinging bar carrying a set of type and spring-impelled in a direction to move said type to the printing line but normally restrained with the foremost type withdrawn from such line, a latch for preventing movement of the bar in accumulating operations of the machine, and stops for determining the extent of movement of said bar in other operations of the machine.

20. In a machine of the character described, the combination with accumulating and item and total printing mechanisms; of means for automatically characterizing certain of the imprints comprising a normally restrained spring-impelled type carrier, a swinging stepped segment operatively connected with said carrier, a latch for preventing movement of the segment in an accumulating operation of the machine, and stops for determining the extent of movement of said segment in other operations of the machine.

21. In a machine of the character described, the combination with accumulating and item and total printing mechanisms; of means for automatically characterizing certain of the imprints comprising a swinging bar carrying a set of type and spring-impelled in a direction to move said type to the printing line but normally restrained with the foremost type withdrawn from such line, a swinging stepped segment operatively connected with said bar, a latch for preventing movement of the segment in an accumulating operation of the machine, and stops for determining the extent of movement of said segment in other operations of the machine.

22. In a machine of the character described, the combination with accumulating and item and total printing mechanisms, of means for automatically characterizing certain of the imprints comprising a normally restrained spring-impelled type carrier, a swinging stepped segment operatively connected with said carrier, a latch for preventing movement of the segment in an accumulating operation of the machine, and stops for determining the extent of movement of said segment in other operations of the machine comprising a fixed stop to measure the maximum movement of the segment by presenting an abutment to one of the steps, and one or more movable stops to measure lesser degrees of movement of the segment; substantially as and for the purpose described.

23. In a machine of the character described, the combination with accumulating and item and total printing mechanisms; of means for automatically characterizing certain of the imprints comprising a swinging bar carrying a set of type and spring-impelled in a direction to move said type to the printing line but normally restrained with the foremost type withdrawn from such line, a swinging stepped segment operatively connected with said bar, a latch for preventing movement of the segment in an accumulating operation of the machine, and stops for determining the extent of movement of said segment in other operations of the machine comprising a fixed stop to measure the maximum movement of the segment by presenting an abutment to one of the steps, and one or more movable stops to measure lesser degrees of movement of the segment; substantially as and for the purpose described.

24. In a machine of the character described, the combination with accumulating and item and total printing mechanisms; of means for automatically characterizing certain of the imprints comprising a normally restrained spring-impelled type carrier, a normally withdrawn latch for preventing movement of the carrier, means for moving said latch into effective position for accumulating operations following that pertaining to the first item, means for maintaining the latch displaced for other operations, and stops determining the extent of movement of said carrier in such other operations.

25. In a machine of the character described, the combination with accumulating and item and total printing mechanisms; of means for automatically characterizing certain of the imprints comprising a normally restrained spring-impelled type carrier, a swinging stepped segment operatively connected with said carrier, a normally withdrawn latch for preventing movement of said segment, means for moving said latch into effective position for accumulating operations following that pertaining to the first item, means for maintaining the latch displaced for other operations, and stops determining the extent of movement of said segment in such other operations.

26. In a machine of the character described, the combination with accumulating and item and total printing mechanisms; of means for automatically characterizing certain of the imprints comprising a normally restrained spring-impelled type carrier, a normally withdrawn latch for preventing movement of the carrier, a spring for moving said latch into effective position for accumulating operations following that pertaining to the first item, means for maintaining the latch displaced for other operations, and stops determining the extent of movement of said carrier in such other operations.

27. In a machine of the character described, the combination with accumulating and item and total printing mechanisms; of means for automatically characterizing certain of the imprints comprising a normally restrained spring-impelled type carrier, a swinging stepped segment operatively connected with said carrier, a normally withdrawn latch for preventing movement of said segment, a spring for moving said latch into effective position for accumulating operations following that pertaining to the first item, means for maintaining the latch displaced for other operations, and stops determining the extent of movement of said segment in such other operations.

28. In a machine of the character described, the combination with accumulating and item and total printing mechanisms; of means for automatically characterizing certain of the imprints comprising a normally restrained spring-impelled type carrier, a set of stops to differentially limit the movement of said carrier when freed from such restraint, and means for automatically latching said carrier in normal position during accumulating operations following that pertaining to the first item.

29. In a machine of the character described, the combination with accumulating and item and total printing mechanisms; of means for automatically characterizing certain of the imprints comprising a normally restrained spring-impelled type carrier, a swinging stepped segment operatively connected with said carrier, a set of stops coöperating with said segment to differentially limit the movement of said carrier when free from such restraint, and means for automatically latching said segment in normal position during accumulating operations following that pertaining to the first item.

30. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish between first items accumulated, following items accumulated, unaccumulated items, totals and subtotals, said means comprising a normally restrained spring-impelled type carrier, and a set of stops to differentially limit the movement of said carrier when freed from such restraint.

31. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a swinging bar carrying a set of type and spring-impelled in a direction to move said type to the printing line but normally restrained with the foremost type withdrawn from such line, and a set of stops to differentially limit the movement of said bar when freed from such restraint.

32. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a normally restrained spring-impelled type carrier, a swinging stepped segment operatively connected with said carrier, and a set of stops coöperating with said segment to differentially limit the movement of said carrier when freed from such restraint.

33. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a swinging bar carrying a set of type and spring-impelled in a direction to move said type to the printing line but normally restrained with the foremost type withdrawn from such line, a swinging stepped segment operatively connected with said bar, and a set of stops adapted to be severally presented to the segment steps respectively to differentially limit the movement of said bar when free from such restraint.

34. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a normally restrained spring-impelled special type carrier, a latch for preventing movement of said carrier in accumulating operations following that which pertains to the first item of an accumulation, and stops for determining the extent of movement of the carrier in other operations of the machine.

35. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a swinging bar carrying a set of type and spring-impelled in a direction to move said type to the printing line but normally restrained with the foremost type withdrawn from such line, a latch for preventing movement of the bar in accumulating operations following that which pertains to the first item of an accumulation, and stops for determining the extent of movement of the bar in other operations of the machine.

36. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a normally restrained spring-impelled special type carrier, a swinging stepped segment operatively connected with said carrier, a latch for preventing movement of said segment in accumulating operations following that pertaining to the first item, and stops for determining the extent of movement of the segment in other operations of the machine.

37. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a swinging bar carrying a set of type and spring-impelled in a direction to move said type to the printing line but normally restrained with the foremost type withdrawn from such line, a swinging stepped segment operatively connected with said bar, a latch for preventing movement of said segment in accumulating operations following that pertaining to the first item, and stops for determining the extent of movement of the segment in other operations of the machine.

38. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a normally restrained spring-impelled special type carrier, a normally withdrawn latch for preventing movement of the carrier, means for moving said latch into effective position for accumulating operations following that pertaining to the first item, means for maintaining the latch displaced for other operations, and stops determining the extent of movement of said carrier in such other operations.

39. In a machine of the character described, an accumulator, means for actuating the same, devices for controlling the operative relation between said accumulator and its actuating means to cause accumulation of an item, prevent such accumulation, rest the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a swinging bar carrying a set of type and spring-impelled in a direction to move said type to the printing line but normally restrained with the foremost type withdrawn from such line, a normally withdrawn latch for preventing movement of the carrier, means for moving said latch into effective position for accumulating operations following that pertaining to the first item, means for maintaining the latch displaced for other operations, and stops determining the extent of movement of said carrier in such other operations.

40. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a normally restrained spring-impelled special type carrier, a swinging stepped segment operatively connected with said carrier, a normally withdrawn latch for preventing movement of said segment, means for moving said latch into effective position for accumulating operations following that pertaining to the first item, means for maintaining the latch displaced for other operations, and stops determining the extent of movement of said segment in such other operations.

41. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a swinging bar carrying a set of type and spring-impelled in a direction to move said type to the printing line but normally restrained with the foremost type withdrawn from such line, a swinging stepped segment operatively connected with said bar, a normally withdrawn latch for preventing movement of said segment, means for moving said latch into effective position for accumulating operations following that pertaining to the first item, means for maintaining the latch displaced for other operations, and stops determining the extent of movement of said segment in such other operations.

42. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a normally restrained spring-impelled special type carrier, a normally withdrawn latch for preventing movement of the carrier, a spring for moving said latch into effective position for accumulating operations following that pertaining to the first item, means for maintaining the latch displaced for other operations, and stops determining the extent of movement of said carrier in such other operations.

43. In a machine of the character described, an accumulator, means for actuating the same, devices for controlling the operative relation between said accumulator, and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a swinging bar carrying a set of type and spring-impelled in a direction to move said type to the printing line but normally restrained with the foremost type withdrawn from such line, a normally withdrawn latch for preventing movement of the carrier, a spring for moving said latch into effective position for accumulating operations following that pertaining to the first item, means for maintaining the latch displaced for other operations, and stops determining the extent of movement of said carrier in such other operations.

44. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a normally restrained spring-impelled special type carrier, a swinging stepped segment operatively connected with said carrier, a normally withdrawn latch for preventing movement of said segment, a spring for moving said latch into effective position for accumulating operations following that pertaining to the first item, means for maintaining the latch displaced for other operations, and stops determining the extent of movement of said segment in such other operations.

45. In a machine of the character described, an accumulator, means for actuating the same, devices for controlling the operative relation between said accumulator and its actuating means to cause accumulation of an item, prevent such accumulation, reset the accumulator to zero and leave it so set, or reset to zero and restore; printing mechanism working in coöperation with the accumulator; and means for characterizing the imprints to distinguish first items accumulated, unaccumulated items, totals and sub-totals, said means comprising a swinging bar carrying a set of type and spring-impelled in a direction to move said type to the printing line but normally restrained with the foremost type withdrawn from such line, a swinging stepped segment operatively connected with said bar, a normally withdrawn latch for preventing movement of said segment, a spring for moving said latch into effective position for accumulating operations following that pertaining to the first item, means for maintaining the latch displaced for other operations, and stops determining the extent of movement of said segment in such other operations.

46. In a machine of the character described, the combination with accumulating and item and total printing mechanisms, means for disabling the accumulating mechanism, and an automatic signal for showing whether or not the machine contains any registration or accumulation; of means for preventing operation of said signal when a first item is printed with the accumulating mechanism disabled.

47. In a machine of the character described, the combination with accumulating and item and total printing mechanisms, means for disabling the accumulating mechanism, and a shifting signal automatically operating to show whether or not the machine contains any registration or accumulation; and means for preventing the shifting of the signal when the first item is an unaccumulated one.

48. In a machine of the character described, the combination with accumulating and item and total printing mechanisms, means for disabling the accumulating mechanism, and an automatic signal for showing whether or not the machine contains any registration or accumulation; of means for preventing operation of said signal when a first item is printed with the accumulating mechanism disabled together with means for characterizing the imprint of such an item to distinguish it from accumulated items.

49. In a machine of the character described, the combination with accumulating and item and total printing mechanisms, means for disabling the accumulating mechanism, and a shifting signal automatically operating to show whether or not the machine contains any registration or accumulation; and means for preventing the shifting of the signal when the first item is an 50. In a machine of the character described, the combination with accumulating and item and total printing mechanisms, means for disabling the accumulating mechanism, and an automatic signal for showing whether or not the machine contains any registration or accumulation; of means for preventing operation of said signal when a first item is printed with the accumulating mechanism disabled together with means for characterizing the imprint of such an item to distinguish it from accumulated items and for differently characterizing the first accumulated item.

51. In a machine of the character described, the combination with accumulating and item and total printing mechanisms, means for disabling the accumulating mechanism, and a shifting signal automatically operating to show whether or not the machine contains any registration or accumulation; and means for preventing the shifting of the signal when the first item is an unaccumulated one together with means for characterizing the imprint of such an item to distinguish it from accumulated items and for differently characterizing the first accumulated item.

52. In a machine of the character described, the combination with accumulating and item and total printing mechanisms, means for disabling the accumulating mechanism, and an automatic signal for showing whether or not the machine contains any registration or accumulation; of means for preventing operation of said signal when a first item is printed with the accumulating mechanism disabled together with means for characterizing the imprint of such an item to distinguish it from accumulated items and for differently characterizing printed totals.

53. In a machine of the character described, the combination with accumulating and item and total printing mechanisms, means for disabling the accumulating mechanism, and a shifting signal automatically operating to show whether or not the machine contains any registration or accumulation; and means for preventing the shifting of the signal when the first item is an unaccumulated one together with means for characterizing the imprint of such an item to distinguish it from accumulated items and for differently characterizing printed totals.

54. In a machine of the character described, the combination with accumulating and item and total printing mechanisms, means for disabling the accumulating mechanism, and an automatic signal for showing whether or not the machine contains any registration or accumulation; of means for preventing operation of said signal when a first item is printed with the accumulating mechanism disabled together with means for characterizing the imprint of such an item to distinguish it from accumulated items, differently characterizing the first accumulated item and still differently characterizing printed totals.

55. In a machine of the character described, the combination with accumulating and item and total printing mechanisms, means for disabling the accumulating mechanism, and a shifting signal automatically operating to show whether or not the machine contains any registration or accumulation; and means for preventing the shifting of the signal when the first item is an unaccumulated one together with means for characterizing the imprint of such an item to distinguish it from accumulated items, differently characterizing the first accumulated item and still differently characterizing printed totals.

56. In a machine of the character described, the combination with accumulating and item and total printing mechanisms, and means for disabling the accumulating mechanism; of automatic means for characterizing the imprint of an unaccumulated item and for differently characterizing the first of a series of imprints of accumulated items to distinguish those items from each other and from following imprints of accumulated items.

57. In a machine of the character described, the combination with accumulating and item and total printing mechanisms, and means for disabling the accumulating mechanism; of means for automatically printing a special character in association with the imprint of an unaccumulated item and as an incident to the production thereof, and means for automatically printing a different special character in association with the imprint of the first of a series of accumulated items and as an incident to the production thereof.

58. In a machine of the character described, the combination with accumulating and item and total printing mechanisms; of a special type carrier normally occupying a non-printing position, means for latching it in such position during the printing of accumulated items after the first of such items in a series, means for disabling the latching means in taking a total, means for maintaining the latter means disabled during the printing of the first item for accumulation, and a stop to determine the printing position of the special type carrier for characterizing such first item.

59. In a machine of the character described, the combination with accumulating and item and total printing mechanisms; of a special type carrier normally occupying a non-printing position, a latch spring-pressed to effective position for maintaining the type carrier at normal, means for displacing the latch in the taking of a total, and means for setting the special type carrier at printing position for characterizing the imprint of the first item of a series to be accumulated with provisions for release of the latch as an incident to the taking of such imprint and its automatic return to effective position for holding the type carrier out of printing position while imprints are being taken of the other items of such accumulation series.

60. In a machine of the character described, the combination with accumulating and item and total printing mechanisms and means for disabling the accumulating mechanism, of a special type carrier normally occupying a non-printing position, a latch spring-pressed to effective position for maintaining the type carrier at normal, means for displacing the latch in the taking of a total, means for setting the special type carrier at printing position for characterizing the imprint of the first item of a series to be accumulated with provisions for release of the latch as an incident to the taking of such imprint and its automatic return to effective position for holding the type carrier out of printing position while imprints are being taken of the other items of such accumulation series, and means for displacing said latch in disabling the accumulating mechanism with provisions for positioning the special type carrier to characterize the imprint of an unaccumulated item.

61. In a machine of the character described, the combination with accumulating and item and total printing mechanisms; of a special type carrier normally occupying a non-printing position, means for latching it in such position during the printing of accumulated items after the first of such items in a series, means for disabling the latching means in taking a total, and a stop to determine the printing position of the special type carrier for characterizing a total imprint.

62. In a machine of the character described, the combination with an accumulator and its actuators, means for controlling coöperative relationship between the same for advancing the accumulator to register an item or for turning the accumulator to zero, and printing mechanism in coöperative relation with said accumulators for producing imprints of a series of items or an imprint of the total thereof; of a special type carrier normally restrained in a non-printing position but adapted to be released from restraint, a latch holding said type carrier in such normal position during printing of items, means for displacing the latch by adjustment of the controlling means for taking a total, and a stop presented by such adjustment to determine the position of the special type-carrier.

63. In a machine of the character described, the combination with an accumulator and its actuators, means for controlling coöperative relationship between the same for advancing the accumulator to register an item or for turning the accumulator to zero and there leaving it, or for turning said accumulator to zero and back again to restore the accumulation, and printing mechanism in coöperative relation with said accumulators for producing imprints of a series of items or an imprint of the total thereof; of a special type carrier normally restrained in a non-printing position but adapted to be released from restraint, a latch holding said type carrier in such normal position during printing of items, means for displacing the latch by adjustment of the controlling means for taking a total, and a stop presented by such adjustment to determine the position of the special type-carrier.

64. In a machine of the character described, the combination with an accumulator and its actuators, means for controlling coöperative relationship between the same for advancing the accumulator to register an item or for turning the accumulator to zero and there leaving it, or for turning said accumulator to zero and back again to restore the accumulation, and printing mechanism in coöperative relation with said accumulator actuators for producing imprints of a series of items or an imprint of the total thereof; of a special type carrier normally restrained in a non-printing position but adapted to be released from restraint, a latch holding said type carrier in such normal position during printing of items, means for displacing the latch by adjustment of the controlling means for taking totals, and stops presented by such adjustment to determine the position of the special type-carrier.

65. In a machine of the character described, the combination with an accumulator and its actuators, means for controlling coöperative relationship between the same for advancing the accumulator to register an item or for turning the accumulator to zero and there leaving it, or for turning said accumulator to zero and back again to restore the accumulation, and printing mechanism in coöperative relation with said accumulators for producing imprints of a series of items or an imprint of the total thereof; of a special type carrier normally restrained in a non-printing position but adapted to be released from restraint, a latch holding said type carrier in such normal position during printing of items, means for displacing the latch by adjustment of the controlling means for taking totals, a stop presented by such adjustment to determine the position of the special type-carrier for characterizing a grand total, and a second stop presented by subtotal adjustment to differently determine the position of the type-carrier.

66. In a machine of the character described, the combination with accumulating and item and total printing mechanisms; of a special type carrier normally restrained in a non-printing position, but adapted to be released from restraint, a swinging stop-plate operatively connected with said carrier, means for latching said plate in normal position during the printing of accumulated items after the first of such items in a series, means for disabling the latching means in taking a total, means for maintaining the latter means disabled during the printing of the first item for accumulation, and a stop to then engage the stop-plate for determining the printing position of the special type-carrier for characterizing such first item.

67. In a machine of the character described, the combination with accumulating and item and total printing mechanisms; of a special type carrier normally restrained in a non-printing position but adapted to be released from restraint, a swinging stop-plate operatively connected with said carrier, a latch spring-pressed to effective position for engaging said stop plate and maintaining the type carrier at normal, means for displacing the latch in the taking of a total, and means for setting the special type carrier at printing position for characterizing the imprint of the first item of a series to be accumulated with provisions for release of the latch as an incident to the taking of such imprint and its automatic return to effective position for holding the type carrier out of printing position while imprints are being taken of the other items of such accumulation series.

68. In a machine of the character described, the combination with accumulating and item and total printing mechanisms and means for disabling the accumulating mechanism; of a special type carrier normally restrained in a non-printing position but adapted to be released from restraint, a swinging stop-plate operatively connected with said carrier, a latch spring-pressed to effective position for engaging said stop plate and maintaining the type carrier at normal, means for displacing the latch in the taking of a total, means for setting the special type carrier at printing position for characterizing the imprint of the first item of a series to be accumulated, with provisions for release of the latch as an incident to the taking of such imprint and its automatic return to effective position for holding the type carrier out of printing position while imprints are being taken of the other items of such accumulation series, and means for displacing said latch in disabling the accumulating mechanism with provisions for positioning the special type carrier to characterize the imprint of an unaccumulated item.

69. In a machine of the character described, the combination with accumulating and item and total printing mechanisms; of a special type carrier normally restrained in a non-printing position, but adapted to be released from restraint, a swinging stop-plate operatively connected with said carrier, means for latching said plate in normal position during the printing of accumulated items after the first of such items in a series, means for disabling the latching means in taking a total, and a stop to determine the printing position of the special type carrier for characterizing a total imprint.

70. In a machine of the character described, the combination with accumulating and item and total printing mechanisms, and means for disabling the accumulating mechanism; of a special type carrier normally restrained in a non-printing position but adapted to be released from such restraint, a swinging stepped segment operatively connected with said carrier, means for latching the segment in normal position during the printing of accumulated items in a series after the first of such items, means for disabling the latching means in taking a total, means for maintaining said latching means disabled during the printing of the first accumulation item, and stops for presentation to steps of the segment respectively to determine different positions of the type carrier for distinguishably characterizing imprints of unaccumulated and first accumulated items.

71. In a machine of the character described, the combination with an accumulator and its actuators, means for controlling coöperative relationship between the same for advancing the accumulator to register an item or for turning the accumulator to zero, and printing mechanism in coöperative relation with said accumulator actuators for producing imprints of a series of items or an imprint of the total thereof; of a special type carrier normally restrained in a non-printing position but adapted to be released from restraint, a swinging stop plate operatively connected with said carrier, a latch holding said stop plate at normal during printing of items, means for displacing the latch by adjustment of the controlling means for taking a total, and a stop presented to the stop plate by such adjustment to determine the position of the special type-carrier.

72. In a machine of the character described, the combination with an accumulator and its actuators, means for controlling coöperative relationship between the same for advancing the accumulator to register an item or for turning the accumulator to zero, and there leaving it or for turning said accumulator to zero and back again to restore the accumulation, and printing mechanism in coöperative relation with said accumulator actuators for producing imprints of a series of items or an imprint of the total thereof; of a special type carrier normally restrained in a non-printing position but adapted to be released from restraint, a stop plate operatively connected with said carrier, a latch holding said stop plate at normal during printing of items, means for displacing the latch by adjustment of the controlling means for taking a total, and a stop presented to the stop plate by such adjustment to determine the position of the special type-carrier.

73. In a machine of the character described, the combination with an accumulator and its actuators, means for controlling coöperative relationship between the same for advancing the accumulator to register an item or for turning the accumulator to zero, and there leaving it or for turning said accumulator to zero and back again to restore the accumulation, and printing mechanism in coöperative relation to said accumulator actuators for producing imprints of a series of items or an imprint of the total thereof; of a special type carrier normally restrained in a non-printing position but adapted to be released from restraint, a stepped segment operatively connected with said carrier, a latch holding said stepped segment at normal during printing of items, means for displacing the latch by adjustment of the controlling means for taking totals, and stops presented to steps of the segment respectively to determine the positions of the type carrier.

74. In a machine of the character described, the combination with an accumulator and its actuators, means for controlling coöperative relationship between the same for advancing the accumulator to register an item or for turning the accumulator to zero, and there leaving it or for turning said accumulator to zero and back again to restore the accumulation, and printing mechanism in coöperative relation to said accumulator actuators for producing imprints of a series of items or an imprint of the total thereof; of a special type carrier normally restrained in a non-printing position but adapted to be released from restraint, a stepped segment operatively connected with said carrier, a latch holding said stepped segment at normal during printing of items, means for displacing the latch by adjustment of the controlling means for taking totals, a stop presented to a step of the segment by such adjustment to determine the position of the type carrier for characterizing a grand total, and a second stop presented to another step of said segment by sub-total adjustment for positioning the type carrier to differently characterize the imprint.

75. In a machine of the character described, the combination with setting up devices, accumulating and item and total printing mechanisms and actuating means for said mechanisms; of a special type-carrier, a latch for the same, a vibrating arm linked to said latch, a latch restraining said arm and thereby holding the type-carrier latch displaced, means for displacing the arm-latch in setting up an item, and means for continuing the restraint of the arm under control of said actuating means.

76. In a machine of the character described, the combination with setting up devices, accumulating and item and total printing mechanisms and actuating means for said mechanisms; of a special type-carrier, a latch for the same spring-pressed to effective position, a vibrating arm linked to said latch, a latch restraining said arm and thereby holding the type-carrier latch displaced, means for displacing the arm-latch in setting up an item, and means for continuing the restraint of the arm under control of said actuating means.

77. In a machine of the character described, the combination with setting up devices, accumulating and item and total printing mechanisms, actuating means for said mechanisms; and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm by the setting of the means for disabling the accumulating mechanism.

78. In a machine of the character described, the combination with setting up devices, accumulating and item and total printing mechanisms, actuating means for said mechanisms; and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for displacing the type-carrier latch by the setting of the means for disabling the accumulating mechanism.

79. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm by the setting of the means for disabling the accumulating mechanism with provisions for displacing the type-carrier latch should the latter be in effective position at the time said disabling means are set.

80. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm by the setting of the means for disabling the accumulating mechanism.

81. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of said actuating means and means for displacing the type-carrier latch by the setting of the means for disabling the accumulating mechanism.

82. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm by the setting of the means for disabling the accumulating mechanism with provisions for displacing the type-carrier latch should the latter be in effective position at the time said disabling means are set.

83. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm and presenting a stop for the type-carrier by the setting of the means for disabling the accumulating mechanism.

84. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for displacing the type-carrier latch and presenting a stop for the type-carrier by the setting of the means for disabling the accumulating mechanism.

85. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine and means for restraining the arm by the setting of the means for disabling the accumulating mechanism with provisions for displacing the type-carrier latch should the latter be in effective position at the time said disabling means are set and for presenting a stop to determine the printing position of the type-carrier.

86. In a machine of the character described, the combination with setting up devices, accumulating and item and total printing mechanisms and actuating means for said mechanisms; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, and means for continuing the restraint of the arm under control of said actuating means.

87. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for obstructing the slotted link by the setting of the accumulator disabling means.

88. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for obstructing the slotted link by the setting of the accumulator disabling means with provisions for displacing the link and thereby the type-carrier latch should the latter be in effective position at the time said disabling means are set.

89. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for displacing the slotted link and thereby the type-carrier latch by setting the accumulator disabling means.

90. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for obstructing the slotted link by the setting of the accumulator disabling means and presenting a stop to determine the printing position of the type-carrier.

91. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for obstructing the slotted link by the setting of the accumulator disabling means with provisions for displacing the link and thereby the type-carrier latch should the latter be in effective position at the time said disabling means are set and for presenting a stop to determine the printing position of said carrier.

92. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for displacing the slotted link and thereby the type-carrier latch by setting the accumulator disabling means with provisions for presenting a stop to determine the printing position of the type-carrier.

93. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for obstructing the slotted link by the setting of the accumulator disabling means, the same comprising a bar adapted to be thrust into the path of the link.

94. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for obstructing the slotted link by the setting of the accumulator disabling means with provisions for displacing the link and thereby the type-carrier latch should the latter be in effective position at the time said disabling means are set, comprising a bar adapted to be thrust into the path of the link or against the side of the same.

95. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means and means for displacing the slotted link and thereby the type-carrier latch by setting the accumulator disabling means, the same comprising a bar adapted to be thrust against the link.

96. In a machine of the character described, the combination with setting up devices, accumulating and item and total printing mechanisms and actuating means for said mechanisms; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means operated in the taking of a total to restore the arm to normal position.

97. In a machine of the character described, the combination with setting up devices, accumulating and item and total printing mechanisms and actuating means for said mechanisms; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of said actuating means and means operated in the taking of a total to restore the arm to normal position.

98. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism and means operated in the taking of a total to restore the arm to normal position.

99. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for displacing the type-carrier latch by the setting of the means for disabling the accumulating mechanism, and means operated in the taking of a total to restore the arm to normal position.

100. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism with provisions for displacing the type-carrier latch should the latter be in effective position at the time said disabling means are set, and means operated in the taking of a total to restore the arm to normal position.

101. In a machine of the character described, the combination with setting up devices, accumulating and item and total printing mechanisms and actuating means for said mechanisms; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means operated in the taking of a total to restore the arm to normal position with provisions for presenting a stop to determine the printing position of the type-carrier for characterizing a total.

102. In a machine of the character described, the combination with setting up devices, accumulating and item and total printing mechanisms and actuating means for said mechanisms; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of said actuating means and means operated in the taking of a total to restore the arm to normal position with provisions for presenting a stop to determine the printing position of the type-carrier for characterizing a total.

103. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism and means operated in the taking of a total to restore the arm to normal position with provisions for presenting a stop to determine the printing position of the type-carrier for characterizing a total.

104. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for displacing the type-carrier latch by the setting of the means for disabling the accumulating mechanism, and means operated in the taking of a total to restore the arm to normal position with provisions for presenting a stop to determine the printing position of the type-carrier for characterizing a total.

105. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism with provisions for displacing the type-carrier latch should the latter be in effective position at the time said disabling means are set, and means operated in the taking of a total to restore the arm to normal position with provisions for presenting a stop to determine the printing position of the type-carrier for characterizing a total.

106. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism, at the same time presenting a stop to determine the printing position of the type-carrier for characterizing an unaccumulated item, and means operated in the taking of a total to restore the vibratory arm to normal.

107. In a machine of the character described, the combination with setting up devices, accumulating and item and total printing mechanisms, actuating means for said mechanisms and means for disabling the accumulating mechanism: of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for displacing the type-carrier latch by the setting of the means for disabling the accumulating mechanism, at the same time presenting a stop to determine the printing position of the type-carrier for characterizing an unaccumulated item, and means operated in the taking of a total to restore the vibratory arm to normal.

108. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism with provisions for displacing the type-carrier latch should the latter be in effective position at the time said disabling means are set, at the same time presenting a stop to determine the printing position of the type-carrier for characterizing an unaccumulated item, and means operated in the taking of a total to restore the vibratory arm to normal.

109. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism, at the same time presenting a stop to determine the printing position of the type-carrier for characterizing an unaccumulated item, and means operated in the taking of a total to restore the vibratory arm to normal with provisions for presenting a stop to determine the printing position of the type-carrier for characterizing a total.

110. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for displacing the type-carrier latch by the setting of the means for disabling the accumulating mechanism, at the same time presenting a stop to determine the printing position of the type-carrier for characterizing an unaccumulated item, and means operated in the taking of a total to restore the vibratory arm to normal with provisions for presenting a stop to determine the printing position of the type-carrier for characterizing a total.

111. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism with provisions for displacing the type-carrier latch should the latter be in effective position at the time said disabling means are set, at the same time presenting a stop to determine the printing position of the type-carrier for characterizing an unaccumulated item, and means operated in the taking of a total to restore the vibratory arm to normal with provisions for presenting a stop to determine the printing position of the type-carrier for characterizing a total.

112. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of said actuating means. means for restraining the arm by the setting of the means for disabling the accumulating mechanism, at the same time presenting a stop to the stepped segment to determine the printing position of the type-carrier for characterizing an unaccumulated item, and means operated in the taking of a total to restore the vibratory arm to normal with provisions for presenting a stop to the stepped segment to determine the printing position of the type-carrier for characterizing a total.

113. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for displacing the type-carrier latch by the setting of the means for disabling the accumulating mechanism, at the same time presenting a stop to the stepped segment to determine the printing position of the type-carrier for characterizing an unaccumulated item, and means operated in the taking of a total to restore the vibratory arm to normal with provisions for presenting a stop to the stepped segment to determine the printing position of the type-carrier for characterizing a total.

114. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism with provisions for displacing the type-carrier latch should the latter be in effective position at the time said disabling means are set, at the same time presenting a stop to the stepped segment to determine the printing position of the type-carrier for characterizing an unaccumulated item, and means operated in the taking of a total to restore the vibratory arm to normal with provisions for presenting a stop to the stepped segment to determine the printing position of the type-carrier for characterizing a total.

115. In a machine of the character described, the combination with setting up devices, accumulating and item and total printing mechanisms and actuating means for said mechanisms; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means operated in the taking of a total to displace the latch and set a stop to determine the printing position of the type-carrier.

116. In a machine of the character described, the combination with setting up devices, accumulating and item and total printing mechanisms and actuating means for said mechanisms; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of said actuating means and means operated in the taking of a total to displace the latch and set a stop to determine the printing position of the type-carrier.

117. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism and means operated in the taking of a total to displace the latch and set a stop to determine the printing position of the type-carrier.

118. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for displacing the type-carrier latch by the setting of the means for disabling the accumulating mechanism and means operated in the taking of a total to displace the latch and set a stop to determine the printing position of the type-carrier.

119. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for restraining the arm by the setting of the means for disabling the accumulating mechanism with provisions for displacing the type-carrier latch should the latter be in effective position at the time said disabling means are set and means operated in the taking of a total to displace the latch and set a stop to determine the printing position of the type-carrier.

120. In a machine of the character described, the combination with setting up devices, accumulating and item and total printing mechanisms and actuating means for said mechanisms; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means, and means operated in the taking of a total to displace the latch and set a stop to determine the printing position of the type-carrier.

121. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means, means for obstructing the slotted link by the setting of the accumulator disabling means and means operated in the taking of a total to displace the latch and set a stop to determine the printing position of the type-carrier.

122. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means, means for obstructing the slotted link by the setting of the accumulator disabling means with provisions for displacing the link and thereby the type-carrier latch should the latter be in effective position at the time said disabling means are set and means operated in the taking of a total to displace the latch and set a stop to determine the printing position of the type-carrier.

123. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means, means for displacing the slotted link and thereby the type-carrier latch by setting the accumulator disabling means and means operated in the taking of a total to displace the latch and set a stop to determine the printing position of the type-carrier.

124. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means, means for obstructing the slotted link by the setting of the accumulator disabling means, the same comprising a bar adapted to be thrust into the path of the link and means operated in the taking of a total to displace the latch and set a stop to determine the printing position of the type-carrier.

125. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means, means for obstructing the slotted link by the setting of the accumulator disabling means with provisions for displacing the link and thereby the type-carrier latch should the latter be in effective position at the time said disabling means are set, comprising a bar adapted to be thrust into the path of the link or against the side of the same, and means operated in the taking of a total to displace the latch and set a stop to determine the printing position of the type-carrier.

126. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of said actuating means, means for displacing the slotted link and thereby the type-carrier latch by setting the accumulator disabling means, the same comprising a bar adapted to be thrust against the link; and means operated in the taking of a total to displace the latch and set a stop to determine the printing position of the type-carrier.

127. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm by the setting of the means for disabling the accumulating mechanism, at the same time presenting a stop to determine the printing position of the type-carrier for characterizing an unaccumulated item, and means operated in the taking of a total to displace the latch and set a stop to determine the printing position of the type-carrier for characterizing a total.

128. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means, means for displacing the type-carrier latch by the setting of the means for disabling the accumulating mechanism, at the same time presenting a stop to determine the printing position of the type-carrier for characterizing an unaccumulated item and means operated in the taking of a total to displace the latch and set a stop to determine the printing position of the type-carrier for characterizing a total.

129. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm by the setting of the means for disabling the accumulating mechanism with provisions for displacing the type-carrier latch should the latter be in effective position at the time said disabling means are set, at the same time presenting a stop to determine the printing position of the type-carrier for characterizing an unaccumulated item, and means operated in the taking of a total to displace the latch and set a stop to determine the printing position of the type-carrier for characterizing a total.

130. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm by the setting of the means for disabling the accumulating mechanism, at the same time presenting a stop to the stepped segment to determine the printing position of the type-carrier for characterizing an unaccumulated item, and means operated in the taking of a total to displace the latch and set a stop to the stepped segment to determine the printing position of the type-carrier for characterizing a total.

131. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for displacing the type-carrier latch by the setting of the means for disabling the accumulating mechanism, at the same time presenting a stop to the stepped segment to determine the printing position of the type-carrier for characterizing an unaccumulated item and means operated in the taking of a total to displace the latch and set a stop for the stepped segment to determine the printing position of the type-carrier for characterizing a total.

132. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of said actuating means and means for restraining the arm by the setting of the means for disabling the accumulating mechanism with provisions for displacing the type-carrier latch should the latter be in effective position at the time said disabling means are set, at the same time presenting a stop to the stepped segment to determine the printing position of the type-carrier for characterizing an unaccumulated item, and means operated in the taking of a total to displace the latch and set a stop for the stepped segment to determine the printing position of the type-carrier for characterizing a total.

133. In a machine of the character described, the combination with amount-determinative setting-up devices, an accumulator, actuating mechanism for the latter controlled in extent of effectiveness thereon by said setting-up devices, printing mechanism including type-carriers set by said accumulator actuating mechanism, manipulative devices controlling coöperative relationship between said mechanism and the accumulator and adjustable to cause accumulation or total printing with or without return of accumulator to show the accumulation, and means for divorcing the accumulator and its actuating mechanism; of a normally restrained spring-drawn special type-bar carrying type to characterize items as unaccumulated, first accumulated, totals and sub-totals; means for freeing and restoring said bar in every operation of the accumulator actuating mechanism; a stepped segment differentially movable and operatively connected with said type bar; a spring-impelled latch to hold the said segment at normal and the type-bar withdrawn from printing position; a link having a slot and pin connection with said latch; a spring drawn vibratory arm coupled to said link; a latch for restraining said arm and link and the first-mentioned latch; means for displacing said arm-latch by operation of the setting-up devices; a second latch for restraining said arm; means for displacing said second arm-latch at an advanced stage in the operation of the accumulator actuating mechanism; displacing and restraining means for the segment latch rendered effective by manipulation of the controlling devices for producing a sub-total imprint; means for restoring the arm and link to normal and withdrawing the segment latch by manipulation of said controlling devices for producing a grand total imprint; means operated by the accumulator disabling means to restrain the arm and link or displace the latter according as the accumulator is at zero or not; stops for the stepped segment adapted to be moved into effective positions by the total, sub-total and accumulator disabling devices respectively; and a stop for limiting the movement of the segment in accumulating the first item of a series.

134. In a machine of the character described, the combination with setting up devices, accumulating and item and total printing mechanisms and actuating means for said mechanisms; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine and a shifting visual signal operatively connected with said vibratory arm; substantially as and for the purpose described.

135. In a machine of the character described, the combination with setting up devices, accumulating and item and total printing mechanisms and actuating means for said mechanisms; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of the actuating means of the machine and a shifting visual signal operatively connected with said vibratory arm; substantially as and for the purpose described.

136. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism and a shifting visual signal operatively connected with said vibratory arm; substantially as and for the purpose described.

137. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism and a shifting visual signal operatively connected with said vibratory arm; substantially as and for the purpose described.

138. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set and a shifting visual signal operatively connected with said vibratory arm; substantially as and for the purpose described.

139. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism and a shifting visual signal operatively connected with said vibratory arm; substantially as and for the purpose described.

140. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism and a shifting visual signal operatively connected with said vibratory arm; substantially as and for the purpose described.

141. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set and a shifting visual signal operatively connected with said vibratory arm; substantially as and for the purpose described.

142. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm and presenting a stop for the type-carrier by the setting of the means for disabling the accumulating mechanism and a shifting visual signal operatively connected with said vibratory arm; substantially as and for the purpose described.

143. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch and presenting a stop for the type-carrier by the setting of the means for disabling the accumulating mechanism and a shifting visual signal operatively connected with said vibratory arm; substantially as and for the purpose described.

144. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set and for presenting a stop to determine the printing position of the type-carrier and a shifting visual signal operatively connected with said vibratory arm; substantially as and for the purpose described.

145. In a machine of the character described, the combination with setting up devices, accumulating and item and total printing mechanisms and actuating means for said mechanisms; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine and a shifting visual signal operatively connected with said vibratory arm; substantially as and for the purpose described.

146. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means and a shifting visual signal operatively connected with said vibratory arm; substantially as and for the purpose described.

147. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means with provisions for displacing the link and thereby the type-carrier latch should the latter be in effective position at the time said disabling means are set and a shifting visual signal operatively connected with said vibratory arm; substantially as and for the purpose described.

148. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for displacing the slotted link and thereby the type-carrier latch by setting the accumulator disabling means and a shifting visual signal operatively connected with said vibratory arm; substantially as and for the purpose described.

149. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means and presenting a stop to determine the printing position of the type-carrier and a shifting visual signal operatively connected with said vibratory arm; substantially as and for the purpose described.

150. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibratory arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means with provisions for displacing the link and thereby the type-carrier latch should the latter be in effective position at the time said disabling means are set and for presenting a stop to determine the printing position of said carrier and a shifting visual signal operatively connected with said vibratory arm; substantially as and for the purpose described.

151. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for displacing the slotted link and thereby the type-carrier latch by setting the accumulator disabling means with provisions for presenting a stop to determine the printing position of the type-carrier and a shifting visual signal operatively connected with said vibratory arm; substantially as and for the purpose described.

152. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means, the same comprising a bar adapted to be thrust into the path of the link; and a shifting visual signal operatively connected with said vibratory arm; substantially as and for the purpose described.

153. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means with provisions for displacing the link and thereby the type-carrier latch should the latter be in effective position at the time said disabling means are set, comprising a bar adapted to be thrust into the path of the link or against the side of the same; and a shifting visual signal operatively connected with said vibratory arm; substantially as and for the purpose described.

154. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for displacing the slotted link and thereby the type-carrier latch by setting the accumulator disabling means, the same comprising a bar adapted to be thrust against the link; and a shifting visual signal operatively connected with said vibratory arm; substantially as and for the purpose described.

155. In a machine of the character described, the combination with setting up devices, accumulating and item and total printing mechanisms and actuating means for said mechanisms; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means operated in the taking of a total to restore the arm to normal position and a shifting visual signal operatively connected with said vibratory arm; substantially as and for the purpose described.

156. In a machine of the character described, the combination with setting up devices, accumulating and item and total printing mechanisms and actuating means for said mechanisms; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of the actuating means of the machine, means operated in the taking of a total to restore the arm to normal position and a shifting visual signal operatively connected with said vibratory arm; substantially as and for the purpose described.

157. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism, means operated in the taking of a total to restore the arm to normal position and a shifting visual signal operatively connected with said vibratory arm; substantially as and for the purpose described.

158. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism, means operated in the taking of a total to restore the arm to normal position and a shifting visual signal operatively connected with said vibratory arm; substantially as and for the purpose described.

159. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set, means operated in the taking of a total to restore the arm to normal position and a shifting visual signal operatively connected with said vibratory arm; substantially as and for the purpose described.

160. In a machine of the character described, the combination with setting up devices, accumulating and item and total printing mechanisms and actuating means for said mechanisms; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means operated in the taking of a total to restore the arm to normal position with provisions for presenting a stop to determine the printing position of the type-carrier for characterizing a total and a shifting visual signal operatively connected with said vibratory arm; substantially as and for the purpose described.

161. In a machine of the character described, the combination with setting up devices, accumulating and item and total printing mechanisms and actuating means for said mechanisms; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of the actuating means of the machine, means operated in the taking of a total to restore the arm to normal position with provisions for presenting a stop to determine the printing position of the type-carrier for characterizing a total and a shifting visual signal operatively connected with said vibratory arm; substantially as and for the purpose described.

162. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism, means operated in the taking of a total to restore the arm to normal position with provisions for presenting a stop to determine the printing position of the type-carrier for characterizing a total, and a shifting visual signal operatively connected with said vibratory arm; substantially as and for the purpose described.

163. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism, means operated in the taking of a total to restore the arm to normal position with provisions for presenting a stop to determine the printing position of the type-carrier for characterizing a total and a shifting visual signal operatively connected with said vibratory arm; substantially as and for the purpose described.

164. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set, means operated in the taking of a total to restore the arm to normal position with provisions for presenting a stop to determine the printing position of the type-carrier for characterizing a total and a shifting visual signal operatively connected with said vibratory arm; substantially as and for the purpose described.

165. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism, at the same time presenting a stop to determine the printing position of the type-carrier for characterizing an unaccumulated item, means operated in the taking of a total to restore the vibratory arm to normal and a shifting visual signal operatively connected with said vibratory arm; substantially as and for the purpose described.

166. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism, at the same time presenting a stop to determine the printing position of the type-carrier for characterizing an unaccumulated item, and means operated in the taking of a total to restore the vibratory arm to normal and a shifting visual signal operatively connected with said vibratory arm; substantially as and for the purpose described.

167. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set, at the same time presenting a stop to determine the printing position of the type-carrier for characterizing an unaccumulated item, means operated in the taking of a total to restore the vibratory arm to normal and a shifting visual signal operatively connected with said vibratory arm; substantially as and for the purpose described.

168. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine and means for restraining the arm by the setting of the means for disabling the accumulating mechanism, at the same time presenting a stop to determine the printing position of the type-carrier for characterizing an unaccumulated item, means operated in the taking of a total to restore the vibratory arm to normal with provisions for presenting a stop to determine the printing position of the type-carrier for characterizing a total and a shifting visual signal operatively connected with said vibratory arm; substantially as and for the purpose described.

169. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism, at the same time presenting a stop to determine the printing position of the type-carrier for characterizing an unaccumulated item, means operated in the taking of a total to restore the vibratory arm to normal with provisions for presenting a stop to determine the printing position of the type-carrier for characterizing a total and a shifting visual signal operatively connected with said vibratory arm; substantially as and for the purpose described.

170. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set, at the same time presenting a stop to determine the printing position of the type-carrier for characterizing an unaccumulated item, means operated in the taking of a total to restore the vibratory arm to normal with provisions for presenting a stop to determine the printing position of the type-carrier for characterizing a total and a shifting visual signal operatively connected with said vibratory arm; substantially as and for the purpose described.

171. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism, at the same time presenting a stop to the stepped segment to determine the printing position of the type-carrier for characterizing an unaccumulated item, means operated in the taking of a total to restore the vibratory arm to normal with provisions for presenting a stop to the stepped segment to determine the printing position of the type-carrier for characterizing a total and a shifting visual signal operatively connected with said vibrating arm; substantially as and for the purpose described.

172. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism, at the same time presenting a stop to the stepped segment to determine the printing position of the type-carrier for characterizing an unaccumulated item, means operated in the taking of a total to restore the vibratory arm to normal with provisions for presenting a stop to the stepped segment to determine the printing position of the type-carrier for characterizing a total and a shifting visual signal operatively connected with said vibratory arm; substantially as and for the purpose described.

173. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set, at the same time presenting a stop to the stepped segment to determine the printing position of the type-carrier for characterizing an unaccumulated item, means operated in the taking of a total to restore the vibratory arm to normal with provisions for presenting a stop to the stepped segment to determine the printing position of the type-carrier for characterizing a total and a shifting visual signal operatively connected with said vibratory arm; substantially as and for the purpose described.

174. In a machine of the character described, the combination with setting up devices, accumulating and item and total printing mechanisms and actuating means for said mechanisms; of a special type-carrier, a latch for the same, a vibrating arm linked to said latch a latch restraining said arm and thereby holding the type-carrier latch displaced, means for displacing the arm-latch in setting up an item, means for continuing the restraint of the arm under control of the actuating means of the machine, means operated in the taking of a total to displace the latch and set a stop to determine the printing position of the type-carrier and a shifting visual signal operatively connected with said vibratory arm; substantially as and for the purpose described.

175. In a machine of the character described, the combination with setting up devices, accumulating and item and total printing mechanisms and actuating means for said mechanisms; of a special type-carrier, a latch for the same spring-pressed to effective position, a vibrating arm linked to said latch, a latch restraining said arm and thereby holding the type-carrier latch displaced, means for displacing the arm-latch in setting up an item, means for continuing the restraint of the arm under control of the actuating means of the machine, means operated in the taking of a total to displace the latch and set a stop to determine the printing position of the type-carrier and a shifting visual signal operatively connected with said vibratory arm; substantially as and for the purpose described.

176. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism, means operated in the taking of a total to displace the latch and set a stop to determine the printing position of the type-carrier and a shifting visual signal operatively connected with said vibratory arm; substantially as and for the purpose described.

177. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism, means operated in the taking of a total to displace the latch and set a stop to determine the printing position of the type-carrier and a shifting visual signal operatively connected with said vibratory arm; substantially as and for the purpose described.

178. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set, means operated in the taking of a total to displace the latch and set a stop to determine the printing position of the type-carrier and a shifting visual signal operatively connected with said vibratory arm; substantially as and for the purpose described.

179. In a machine of the character described, the combination with setting up devices, accumulating and item and total printing mechanisms and actuating means for said mechanisms; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means operated in the taking of a total to displace the latch and set a stop to determine the printing position of the type-carrier and a shifting visual signal operatively connected with said vibratory arm; substantially as and for the purpose described.

180. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means, means operated in the taking of a total to displace the latch and set a stop to determine the printing position of the type-carrier and a shifting visual signal operatively connected with said vibratory arm; substantially as and for the purpose described.

181. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means with provisions for displacing the link and thereby the type-carrier latch should the latter be in effective position at the time said disabling means are set, means operated in the taking of a total to displace the latch and set a stop to determine the printing position of the type-carrier and a shifting visual signal operatively connected with said vibratory arm; substantially as and for the purpose described.

182. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for displacing the slotted link and thereby the type-carrier latch by setting the accumulator disabling means, means operated in the taking of a total to displace the latch and set a stop to determine the printing position of the type-carrier and a shifting visual signal operatively connected with said vibratory arm; substantially as and for the purpose described.

183. In a machine of the character described, the combination with seting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means, the same comprising a bar adapted to be thrust into the path of the link, means operated in the taking of a total to displace the latch and set a stop to determine the printing position of the type-carrier and a shifting visual signal operatively connected with said vibratory arm; substantially as and for the purpose described.

184. In a machine of the character described, the combination with setting up devices, accumulating and item and total printing mechanisms, actuating means for said mechanisms and means for disabling the accumulating mechanism; of a special type-carrier, a latch for the same spring pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for obstructing the slotted link by the setting of the accumulator disabling means with provisions for displacing the link and thereby the type-carrier latch should the latter be in effective position at the time said disabling means are set, comprising a bar adapted to be thrust into the path of the link or against the side of the same, means operated in the taking of a total to displace the latch and set a stop to determine the printing position of the type-carrier and a shifting visual signal operatively connected with said vibratory arm; substantially as and for the purpose described.

185. In a machine of the character described, the combination with setting up devices, accumulating and item and total printing mechanisms, actuating means for said mechanisms and means for disabling the accumulating mechanism; of a special type-carrier, a latch for the same spring-pressed to effective position, a vibrating arm, a link connected with said arm and having a slot and pin connection with said latch, a latch restraining said arm and thereby holding the type-carrier latch displaced, means for displacing the arm-latch in setting up an item, means for continuing the restraint of the arm under control of the actuating means of the machine, means for displacing the slotted link and thereby the type-carrier latch by setting the accumulator disabling means, the same comprising a bar adapted to be thrust against the link, means operated in the taking of a total to displace the latch and set a stop to determine the printing position of the type-carrier and a shifting visual signal operatively connected with said vibratory arm; substantially as and for the purpose described.

186. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism, at the same time presenting a stop to determine the printing position of the type-carrier for characterizing an unaccumulated item, means operated in the taking of a total to displace the latch and set a stop to determine the printing position of the type-carrier for characterizing a total and a shifting visual signal operatively connected with said vibrating arm; substantially as and for the purpose described.

187. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism, at the same time presenting a stop to determine the printing position of the type-carrier for characterizing an unaccumulated item, means operated in the taking of a total to displace the latch and set a stop to determine the printing position of the type-carrier for characterizing a total and a shifting visual signal operatively connected with said vibratory arm; substantially as and for the purpose described.

188. In a machine of the character described, the combination with setting up devices, accumulating and item and total printing mechanisms, actuating means for said mechanisms and means for disabling the accumulating mechanism; of a special type-carrier, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism with provisions for displacing the type-carrier latch should the latter be in effective position at the time said disabling means are set, at the same time presenting a stop to determine the printing position of the type-carrier for characterizing an unaccumulated item, means operated in the taking of a total to displace the latch and set a stop to determine the printing position of the typecarrier for characterizing a total and a shifting visual signal operatively connected with said vibratory arm; substantially as and for the purpose described.

189. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for restraining the arm by the setting of the means for disabling the accumulating mechanism, at the same time presenting a stop to the stepped segment to determine the printing position of the type-carrier for characterizing an unaccumulated item, means operated in the taking of a total to displace the latch and set a stop to the stepped segment to determine the printing position of the type-carrier for characterizing a total and a shifting visual signal operatively connected with said vibratory arm; substantially as and for the purpose described.

190. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine, means for displacing the type-carrier latch by the setting of the means for disabling the accumulating mechanism, at the same time presenting a stop to the stepped segment to determine the printing position of the type-carrier for characterizing an unaccumulated item, means operated in the taking of a total to displace the latch and set a stop to the stepped segment to determine the printing position of the type-carrier for characterizing a total and a shifting visual signal operatively connected with said vibratory arm; substantially as and for the purpose described.

191. In a machine of the character described, the combination with setting up devices, accumulating and item and total printing mechanisms, actuating means for said mechanisms and means for disabling the accumulating mechanism; of a special type-carrier, a stepped segment operatively connected therewith, a latch for the same, a vibrating arm linked to said latch, a latch restraining said arm and thereby holding the type-carrier latch displaced, means for displacing the arm-latch in setting up an item, means for continuing the restraint of the arm under control of the actuating means of the machine and means for restraining the arm by the setting of the means for disabling the accumulating mechanism with provisions for displacing the type-carrier latch should the latter be in effective position at the time said disabling means are set, at the same time presenting a stop to the stepped segment to determine the printing position of the type-carrier for characterizing an unaccumulated item, means operated in the taking of a total to displace the latch and set a stop to the stepped segment to determine the printing position of the type-carrier for characterizing a total and a shifting visual signal operatively connected with said vibratory arm; substantially as and for the purpose described.

192. In a machine of the character described, the combination with amount-determinative setting-up devices, an accumulator, actuating mechanism for the latter controlled in extent of effectiveness thereon by said setting-up devices, printing mechanism including type-carriers set by said accumulator actuating mechanism, manipulative devices controlling coöperative relationship between said mechanism and the accumulator and adjustable to cause accumulation or total printing with or without return of accumulator to show the accumulation, and means for divorcing the accumulator and its actuating mechanism; of a normally restrained spring-drawn special type-bar carrying type to characterize items as unaccumulated, first accumulated, totals and sub-totals; means for freeing and restoring said bar in every operation of the accumulator actuating mechanism; a stepped segment differentially movable and operatively connected with said type bar; a spring-impelled latch to hold the said segment at normal and the type-bar withdrawn from printing position; a link having a slot and pin connection with said latch; a spring-drawn vibratory arm coupled to said link; a latch for restraining said arm and link and the first-mentioned latch; means for displacing said arm-latch by operation of the setting-up devices; a second latch for restraining said arm; means for displacing said second arm-latch at an advanced stage in the operation of the accumulator actuating mechanism; displacing and restraining means for the segment latch rendered effective by manipulation of the controlling devices for producing a sub-total imprint; means for restoring the arm and link to normal and withdrawing the segment latch by manipulation of said controlling devices for producing a grand total imprint; means operated by the accumulator disabling means to restrain the arm and link or displace the latter according as the accumulator is at zero or not; steps for the stepped segment adapted to be moved into effective positions by the total, sub-total and accumulator disabling devices respectively; a stop for limiting the movement of the segment in accumulating the first item of a series; and a shifting visual signal operatively connected with said vibratory arm; substantially as and for the purpose described.

193. In a machine of the character described, the combination of an accumulator, actuating mechanism therefor, means variously determining the degree of movement of the latter, means for variously establishing and disestablishing coöperative relationship between the accumulator and its actuating mechanism, a total key and lever for adjusting said means to cause return of the accumulator to zero, printing mechanism including type-carriers operatively connected with the accumulator actuating mechanism, a special type-carrier, a stop plate operatively connected therewith, a latch for said plate, and a stop rod or wire connected with the total lever and adapted to be presented to said stop plate to determine the latter's position for characterizing a total, said lever displacing the latch.

194. In a machine of the character described, the combination of an accumulator, actuating mechanism therefor, means variously determining the degree of movement of the latter, means for variously establishing and disestablishing coöperative relationship between the accumulator and its actuating mechanism, a total key and lever for adjusting said means to cause return of the accumulator to zero, a second key and lever for disabling said means as to disestablishment of coöperative relationship between accumulator and actuator, printing mechanism including type-carriers operatively connected with the accumulator actuating mechanism, a special type-carrier, a stop plate operatively connected therewith, a latch for said plate, and stop rods or wires connected with the said levers respectively and adapted to be presented to the stop plate to determine the latter's position for characterizing totals, one of the levers displacing the latch.

195. In a machine of the character described, the combination of an accumulator, actuating mechanism therefor, means variously determining the degree of movement of the latter, means for variously establishing and disestablishing coöperative relationship between the accumulator and its actuating mechanism, printing mechanism including type-carriers operatively connected with the accumulator actuating mechanism, a special type-carrier, a stop plate operatively connected therewith, a latch for said plate, means for disabling the means for establishing coöperative relation between the accumulator and its actuating mechanism, and a stop piece presented to said stop plate by said disabling means to determine the printing position of the special type-carrier for characterizing an unaccumulated item.

196. In a machine of the character described, the combination of an accumulator, actuating mechanism therefor, means variously determining the degree of movement of the latter, means for variously establishing and disestablishing coöperative relationship between the accumulator and its actuating mechanism, printing mechanism including type-carriers operatively connected with the accumulator actuating mechanism, a special type-carrier, a stop plate operatively connected therewith, a latch for said plate, a lever for disabling the means for establishing coöperative relation between the accumulator and its actuating mechanism, and a stop bar coupled to said lever and presenting an abutment to the stop plate to determine the printing position of the special type-carrier for characterizing an unaccumulated item.

197. In a machine of the character described, the combination of an accumulator, actuating mechanism therefor, means variously determining the degree of movement of the latter, means for variously establishing and disestablishing coöperative relationship between the accumulator and its actuating mechanism, printing mechanism including type-carriers operatively connected with the accumulator actuating mechanism, a special type-carrier, a stop plate operatively connected therewith, a latch for said plate, a lever for disabling the means for establishing coöperative relation between the accumulator and its actuating mechanism, and a stop bar coupled to said lever and presenting an abutment to the stop plate to determine the printing position of the special type-carrier for characterizing an unaccumulated item, said bar adapted to hold the latch displaced.

198. In a machine of the character described, the combination of an accumulator and its actuator relatively movable to establish and disestablish coöperative relationship and normally in such relationship; an oscillatory prime mover; and means operated thereby to disestablish coöperative relationship between the accumulator and actuator at the outset of the prime mover's operation and to reëstablish such relationship at the end of the initial stroke of the oscillatory prime mover.

199. In a machine of the character described, the combination of an accumulator and its actuator relatively movable to establish and disestablish coöperative relationship, an oscillatory prime mover; means for maintaining the accumulator and its actuator out of coöperative relationship during the greater portion of the initial stroke of said prime mover; and means for bringing said parts into coöperative relationship at the end of such stroke, with provisions for disabling the latter means; substantially as and for the purpose described.

200. In a machine of the character described, the combination of an accumulator and its actuator relatively movable to establish and disestablish coöperative relationship, an oscillatory prime mover; means for maintaining the accumulator and its actuator out of coöperative relationship during the greater portion of the initial stroke of said prime mover; and means for bringing said parts into coöperative relationship at the end of such stroke with provisions for disabling the latter means, the same comprising a link having a slot longer at one part than at another.

201. In a machine of the character described, the combination of an accumulator and its actuator relatively movable to establish and disestablish coöperative relationship, an oscillatory prime mover; means for maintaining the accumulator and its actuator out of coöperative relationship during the greater portion of the initial stroke of said prime mover; and means for bringing said parts into coöperative relationship at the end of such stroke with provisions for disabling the latter means, the same comprising a link coupled at one end to the accumulator and at the other through slot and pin connections with the prime mover, the slot being longer at one part than at another.

202. In a machine of the character described, the combination of an accumulator and its actuator relatively movable to establish and disestablish coöperative relationship; a pitman connected with the accumulator, a lever coupled to the pitman; a vibrating arm having a wipe-pawl to act upon the lever and carrying a stud or pin; a link connected at one end with the accumulator and slotted at the other end to engage said stud or pin one part of the slot being longer than another; and means for shifting the slotted end of the link.

203. In a machine of the character described, the combination of an accumulator and its actuator relatively movable to establish and disestablish coöperative relationship, a pitman connected with the accumulator, a lever coupled to the pitman; a vibrating arm having a wipe-pawl to act upon the lever and rock it first one way and then the other, said arm carrying a stud or pin; a link connected at one end with the accumulator and slotted in varying lengths at the other end to engage said pin or stud; and means for shifting the slotted end of said link and simultaneously disabling the wipe-pawl.

204. In a machine of the character described, the combination of an accumulator and its actuator relatively movable to establish and disestablish coöperative relationship, a pitman connected with the accumulator, a lever coupled to the pitman; a vibrating arm having a wipe-pawl to act upon the lever and rock it first one way and then the other, said arm carrying a stud or pin; a link connected at one end with the accumulator and slotted in varying lengths at the other end to engage said pin or stud; and means for shifting the slotted end of said link and simultaneously disabling the wipe-pawl, said means comprising a lever with a protruding end for contact with the latter and a link connecting said lever with the slotted link.

205. In a machine of the character described, the combination of an accumulator and its actuating means; means for controlling coöperative relation between the same adjustable to cause advance of the accumulator or return to zero; means constantly tending to enforce the latter adjustment but normally restrained from so doing; and means for removing such restraint at will.

206. In a machine of the character described, the combination of an accumulator and its actuating means; means for controlling coöperative relation between the same adjustable to cause advance of the accumulator or return to zero, means constantly tending to enforce the latter adjustment but normally restrained from so doing; and a key or keys for removing such restraint at will.

207. In a machine of the character described, the combination of an accumulator and its actuating means; means for controlling coöperative relation between the same, adjustable to cause advance of the accumulator or return to zero; means constantly tending to enforce the latter adjustment; a latch for restraining said means; and means for displacing said latch at will.

208. In a machine of the character described, the combination of an accumulator and its actuating means; means for controlling coöperative relation between the same adjustable to cause advance of the accumulator or return to zero; means constantly tending to enforce the latter adjustment; a latch for restraining said means, and a key or keys for displacing said latch at will.

209. In a machine of the character described, the combination of an accumulator and its actuating means; means for controlling coöperative relation between the same adjustable to cause advance of the accumulator or return to zero; a spring tending to enforce the latter adjustment but normally restrained from so doing; and means for removing such restraint at will.

210. In a machine of the character described, the combination of an accumulator and its actuating means; means for controlling coöperative relation between the same adjustable to cause advance of the accumulator or return to zero; a spring tending to enforce the latter adjustment; a latch for restraining said spring; and means for displacing the latch.

211. In a machine of the character described, the combination of an accumulator and its actuating means; means for controlling coöperative relation between the same adjustable to cause advance of the accumulator or return to zero; a spring tending to enforce the latter adjustment; a latch for restraining said spring; and a key or keys for displacing the latch.

212. In a machine of the character described, the combination of an accumulator and its actuating means; means for controlling coöperative relation between the same adjustable to cause advance of the accumulator or return to zero; means constantly tending to enforce the latter adjustment but normally restrained from so doing; means for removing such restraint at will; and means for restoring the controlling means to normal.

213. In a machine of the character described, the combination of an accumulator and its actuating means; means for controlling coöperative relation between the same adjustable to cause advance of the accumulator or return to zero, means constantly tending to enforce the latter adjustment but normally restrained from so doing; a key or keys for removing such restraint at will; and means for restoring the controlling means to normal.

214. In a machine of the character described, the combination of an accumulator and its actuating means; means for controlling coöperative relation between the same adjustable to cause advance of the accumulator or return to zero; means constantly tending to enforce the latter adjustment; a latch for restraining said means; means for displacing said latch at will; and means for restoring the controlling means to normal.

215. In a machine of the character described, the combination of an accumulator and its actuating means; means for controlling coöperative relation between the same adjustable to cause advance of the accumulator or return to zero; means constantly tending to enforce the latter adjustment; a latch for restraining said means, a key or keys for displacing said latch at will; and means for restoring the controlling means to normal.

216. In a machine of the character described, the combination of an accumulator and its actuating means; means for controlling coöperative relation between the same adjustable to cause advance of the accumulator or return to zero; a spring tending to enforce the latter adjustment but normally restrained from so doing; means for removing such restraint at will; and means for restoring the controlling means to normal.

217. In a machine of the character described, the combination of an accumulator and its actuating means; means for controlling coöperative relation between the same adjustable to cause advance of the accumulator or return to zero; a spring tending to enforce the latter adjustment; a latch for restraining said spring; means for displacing the latch; and means for restoring the controlling means to normal.

218. In a machine of the character described, the combination of an accumulator and its actuating means; means for controlling coöperative relation between the same adjustable to cause advance of the accumulator or return to zero; a spring tending to enforce the latter adjustment; a latch for restraining said spring; a key or keys for displacing the latch; and means for restoring the controlling means to normal.

219. In a machine of the character described, the combination of an accumulator and its actuating means; means for controlling coöperative relation between the same adjustable to cause advance of the accumulator or return to zero; means constantly tending to enforce the latter adjustment but normally restrained from so doing; means for removing such restraint at will; and means for temporarily holding the latter means in operated position.

220. In a machine of the character described, the combination of an accumulator and its actuating means; means for controlling coöperative relation between the same adjustable to cause advance of the accumulator or return to zero; means constantly tending to enforce the latter adjustment but normally restrained from so doing; means for removing such restraint at will; a latch for holding said last named means in operated position; and means for restoring the controlling means to normal and displacing said latch.

221. In a machine of the character described, the combination of an accumulator and its actuating means; means for controlling coöperative relation between the same adjustable to cause advance of the accumulator or return to zero; means constantly tending to enforce the latter adjustment; a latch for normally restraining said means; means for displacing said latch at will; a second latch for holding the latter means in operated position; and mechanism for restoring the controlling means to normal and displacing said second latch.

222. In a machine of the character described, the combination of an accumulator and its actuating means; means for controlling coöperative relation between the same adjustable to cause advance of the accumulator or return to zero or both; normally restrained means constantly tending to enforce the adjustment which causes return of the accumulator to zero; and separately manipulative devices for removing the restraint at will, one operating to cause advance of the accumulator after its return to zero.

223. In a machine of the character described, the combination of an accumulator and its actuating means; means for controlling coöperative relation between the same adjustable to cause advance of the accumulator or return to zero or both; normally restrained means constantly tending to enforce the adjustment which causes return of the accumulator to zero; separately manipulative devices for removing the restraint at will, one operating to cause advance of the accumulator after its return to zero; and means for locking that one by the use of the other.

224. In a machine of the character described, the combination of an accumulator and its actuating means; means for controlling coöperative relation between the same adjustable to cause advance of the accumulator or return to zero or both; normally restrained means constantly tending to enforce the adjustment which causes return of the accumulator to zero; and separately manipulative keys for removing the restraint at will, one operating to cause advance of the accumulator after its return to zero.

225. In a machine of the character described, the combination of an accumulator and its actuating means; means for controlling coöperative relation between the same adjustable to cause advance of the accumulator or return to zero or both; normally restrained means constantly tending to enforce the adjustment which causes return of the accumulator to zero; separately manipulative keys for removing the restraint at will, one operating to cause advance of the accumulator after its return to zero; and means for locking that one by the use of the other.

226. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; and separately manipulative devices for displacing the latch at will, one operating to cause advance of the accumulator after its return to zero.

227. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; and separately manipulative keys for displacing the latch at will, one operating to cause advance of the accumulator after its return to zero.

228. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative devices for displacing the latch at will, one operating to cause advance of the accumulator after its return to zero; and means for locking that one by the use of the other.

229. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative keys for displacing the latch at will, one operating to cause advance of the accumulator after its return to zero; and means for locking that one by the use of the other.

230. In a machine of the character described, the combination of an accumulator and its actuating means; means for controlling coöperative relation between the same adjustable to cause advance of the accumulator or return to zero or both; a normally restrained spring constantly tending to enforce the adjustment which causes return of the accumulator to zero; and separately manipulative devices for removing the restraint at will, one operating to cause advance of the accumulator after its return to zero.

231. In a machine of the character described, the combination of an accumulator and its actuating means; means for controlling coöperative relation between the same adjustable to cause advance of the accumulator or return to zero or both; a normally restrained spring constantly tending to enforce the adjustment which causes return of the accumulator to zero; separately manipulative devices for removing the restraint at will, one operating to cause advance of the accumulator after its return to zero; and means for locking that one by the use of the other.

232. In a machine of the character described, the combination of an accumulator and its actuating means; means for controlling coöperative relation between the same adjustable to cause advance of the accumulator or return to zero or both; a normally restrained spring constantly tending to enforce the adjustment which causes return of the accumulator to zero; and separately manipulative keys for removing the restraint at will, one operating to cause advance of the accumulator after its return to zero.

233. In a machine of the character described, the combination of an accumulator and its actuating means; means for controlling coöperative relation between the same adjustable to cause advance of the accumulator or return to zero or both; a normally restrained spring constantly tending to enforce the adjustment which causes return of the accumulator to zero; separately manipulative keys for removing the restraint at will, one operating to cause advance of the accumulator after its return to zero; and means for locking that one by the use of the other.

234. In a machine of the character described, the combination of an accumulator and its actuating means; means for controlling coöperative relation between the same adjustable to cause advance of the accumulator or return to zero or both; a spring constantly tending to enforce the adjustment which causes return of the accumulator to zero; a latch for restraining said spring and separately manipulative devices for displacing the latch at will, one operating to cause advance of the accumulator after its return to zero.

235. In a machine of the character described, the combination of an accumulator and its actuating means; means for controlling coöperative relation between the same adjustable to cause advance of the accumulator or return to zero or both; a spring constantly tending to enforce the adjustment which causes return of the accumulator to zero, a latch for restraining said spring and separately manipulative keys for displacing the latch at will, one operating to cause advance of the accumulator after its return to zero.

236. In a machine of the character described, the combination of an accumulator and its actuating means; means for controlling coöperative relation between the same adjustable to cause advance of the accumulator or return to zero or both; a spring constantly tending to enforce the adjustment which causes return of the accumulator to zero; a latch for restraining said spring; separately manipulative devices for displacing the latch at will, one operating to cause advance of the accumulator after its return to zero; and means for locking that one by the use of the other.

237. In a machine of the character described, the combination of an accumulator and its actuating means; means for controlling coöperative relation between the same adjustable to cause advance of the accumulator or return to zero or both; a spring constantly tending to enforce the adjustment which causes return of the accumulator to zero; a latch for restraining said spring; separately manipulative keys for displacing the latch at will, one operating to cause advance of the accumulator after its return to zero; and means for locking that one by the use of the other.

238. In a machine of the character described, the combination of an accumulator and its actuating means; means for controlling coöperative relation between the same adjustable to cause advance of the accumulator or return to zero or both; normally restrained means constantly tending to enforce the adjustment which causes return of the accumulator to zero; separately manipulative devices for removing the restraint at will, one operating to cause advance of the accumulator after its return to zero; and means for restoring the controlling means to normal.

239. In a machine of the character described, the combination of an accumulator and its actuating means; means for controlling coöperative relation between the same adjustable to cause advance of the accumulator or return to zero or both; normally restrained means constantly tending to enforce the adjustment which causes return of the accumulator to zero; separately manipulative devices for removing the restraint at will, one operating to cause advance of the accumulator after its return to zero; means for locking that one by the use of the other; and means for restoring the controlling means to normal.

240. In a machine of the character described, the combination of an accumulator and its actuating means; means for controlling coöperative relation between the same adjustable to cause advance of the accumulator or return to zero or both; normally restrained means constantly tending to enforce the adjustment which causes return of the accumulator to zero; separately manipulative keys for removing the restraint at will, one operating to cause advance of the accumulator after its return to zero; and means for restoring the controlling means to normal.

241. In a machine of the character described, the combination of an accumulator and its actuating means; means for controlling coöperative relation between the same adjustable to cause advance of the accumulator or return to zero or both; normally restrained means constantly tending to enforce the adjustment which causes return of the accumulator to zero; separately manipulative keys for removing the restraint at will, one operating to cause advance of the accumulator after its return to zero; means for locking that one by the use of the other; and means for restoring the controlling means to normal.

242. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative devices for displacing the latch at will, one operating to cause advance of the accumulator after its return to zero; and means for restoring the controlling means to normal.

243. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative keys for displacing the latch at will, one operating to cause advance of the accumulator after its return to zero; and means for restoring the controlling means to normal.

244. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative devices for displacing the latch at will, one operating to cause advance of the accumulator after its return to zero; means for locking that one by the use of the other; and means for restoring the controlling means to normal.

245. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative keys for displacing the latch at will, one operating to cause advance of the accumulator after its return to zero; means for locking that one by the use of the other; and means for restoring the controlling means to normal.

246. In a machine of the character described, the combination of an accumulator and its actuating means; means for controlling coöperative relation between the same adjustable to cause advance of the accumulator or return to zero or both; a normally restrained spring constantly tending to enforce the adjustment which causes return of the accumulator to zero; separately manipulative devices for removing the restraint at will, one operating to cause advance of the accumulator after its return to zero; means for restoring the controlling means to normal.

247. In a machine of the character described, the combination of an accumulator and its actuating means; means for controlling coöperative relation between the same adjustable to cause advance of the accumulator or return to zero or both; a normally restrained spring constantly tending to enforce the adjustment which causes return of the accumulator to zero; separately manipulative devices for removing the restraint at will, one operating to cause advance of the accumulator after its return to zero; means for locking that one by the use of the other; and means for restoring the controlling means to normal.

248. In a machine of the character described, the combination of an accumulator and its actuating means; means for controlling coöperative relation between the same adjustable to cause advance of the accumulator or return to zero or both; a normally restrained spring constantly tending to enforce the adjustment which causes return of the accumulator to zero; separately manipulative keys for removing the restraint at will, one operating to cause advance of the accumulator after its return to zero; and means for restoring the controlling means to normal.

249. In a machine of the character described, the combination of an accumulator and its actuating means; means for controlling coöperative relation between the same adjustable to cause advance of the accumulator or return to zero or both; a normally restrained spring constantly tending to enforce the adjustment which causes return of the accumulator to zero; separately manipulative keys for removing the restraint at will, one operating to cause advance of the accumulator after its return to zero; means for locking that one by the use of the other, and means for restoring the controlling means to normal.

250. In a machine of the character described, the combination of an accumulator and its actuating means; means for controlling coöperative relation between the same adjustable to cause advance of the accumulator or return to zero or both; a spring constantly tending to enforce the adjustment which causes return of the accumulator to zero; a latch for restraining said spring; separately manipulative devices for displacing the latch at will, one operating to cause advance of the accumulator after its return to zero; and means for restoring the controlling means to normal.

251. In a machine of the character described, the combination of an accumulator and its actuating means; means for controlling coöperative relation between the same adjustable to cause advance of the accumulator or return to zero or both; a spring constantly tending to enforce the adjustment which causes return of the accumulator to zero; a latch for restraining said spring, separately manipulative keys for displacing the latch at will, one operating to cause advance of the accumulator after its return to zero; and means for restoring the controlling means to normal.

252. In a machine of the character described, the combination of an accumulator and its actuating means; means for controlling coöperative relation between the same adjustable to cause advance of the accumulator or return to zero or both; a spring constantly tending to enforce the adjustment which causes return of the accumulator to zero; a latch for restraining said spring; separately manipulative devices for displacing the latch at will, one operating to cause advance of the accumulator after its return to zero; means for locking that one by the use of the other; and means for restoring the controlling means to normal.

253. In a machine of the character described, the combination of an accumulator and its actuating means; means for controlling coöperative relation between the same adjustable to cause advance of the accumulator or return to zero or both; a spring constantly tending to enforce the adjustment which causes return of the accumulator to zero; a latch for restraining said spring; separately manipulative keys for displacing the latch at will, one operating to cause advance of the accumulator after its return to zero; means for locking that one by the use of the other; and means for restoring the controlling means to normal.

254. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative devices for displacing the latch at will, one operating to cause advance of the accumulator after its return to zero; and means for temporarily restraining the latch in displaced position.

255. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative keys for displacing the latch at will, one operating to cause advance of the accumulator after its return to zero; and means for temporarily restraining the latch in displaced position.

256. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative devices for displacing the latch at will, one operating to cause advance of the accumulator after its return to zero; means for locking that one by the use of the other; and means for temporarily restraining the latch in displaced position.

257. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative keys for displacing the latch at will, one operating to cause advance of the accumulator after its return to zero; means for locking that one by the use of the other; and means for temporarily restraining the latch in displaced position.

258. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative devices for displacing the latch at will, one operating to cause advance of the accumulator after its return to zero; a second latch for temporarily restraining the first-named latch in displaced position; and means for restoring the controlling means to normal and displacing said second latch.

259. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative keys for displacing the latch at will, one operating to cause advance of the accumulator after its return to zero; a second latch for temporarily restraining the first-named latch in displaced position; and means for restoring the controlling means to normal and displacing said second latch.

260. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative devices for displacing the latch at will, one operating to cause advance of the accumulator after its return to zero; means for locking that one by the use of the other; a second latch for temporarily restraining the first-named latch in displaced position; and means for restoring the controlling means to normal and displacing said second latch.

261. In a machine of the character described, the combination of an accumulator and its actuating means; means for controlling coöperative relation between the same adjustable to cause advance of the accumulator or return to zero or both; means constantly tending to enforce the adjustment which causes return of the accumulator to zero; a latch for restraining said means; separately manipulative keys for displacing the latch at will, one operating to cause advance of the accumulator after its return to zero; means for locking that one by the use of the other; a second latch for temporarily restraining the first-named latch in displaced position; and means for restoring the controlling means to normal and displacing said second latch.

262. In a machine of the character described, the combination of an accumulator and its actuating means; means for controlling coöperative relation between the same adjustable to cause advance of the accumulator or return to zero; means constantly tending to enforce the latter adjustment; an angularly slotted latch lever for normally restraining said means; a manipulative device for displacing said lever; and a second manipulative device for displacing said lever by engagement with its slot, with provisions for causing advance of the accumulator after its return to zero.

263. In a machine of the character described, the combination of an accumulator and its actuator relatively movable to establish and disestablish coöperative relationship; a pitman for producing such relative movement with provisions for varying the periods of coöperation; spring-drawn connections for changing the adjustment of said pitman; a lever for reciprocating the latter; an actuating arm having a wipe pawl to rock said lever first one way and then the other; a latch for normally restraining said spring-drawn connections; and a key lever engaging said latch to displace the same and adapted to be projected into the path of the wipe pawl; substantially as and for the purpose described.

264. In a machine of the character described, the combination of an accumulator and its actuator relatively movable to establish and disestablish coöperative relationship; a pitman for producing such relative movements with provisions for varying the periods of coöperation; spring-drawn connections for changing the adjustment of said pitman; a lever for reciprocating the latter; an actuating arm having a wipe pawl to rock said lever first one way and then the other; a latch lever normally restraining said spring-drawn connections and having an angular slot; a key for displacing said latch lever; and a key lever having a stud or pin engaging the angular slot of said latch lever one portion of which slot permits movement of the latter independent of movement of said key lever while the other portion of the slot provides for displacement of the latch lever by movement of the key lever, the latter adapted to enter the path of movement of the wipe pawl; substantially as and for the purpose described.

265. In a machine of the character described, the combination of an accumulator and its actuator relatively movable to establish and disestablish coöperative relationship; a pitman for producing such relative movement with provisions for varying the periods of coöperation; spring-drawn connections for changing the adjustment of said pitman; a lever for reciprocating the latter; an actuating arm having a wipe pawl to rock said lever first one way and then the other; a latch for normally restraining said spring-drawn connections; a key lever engaging said latch to displace the same and adapted to be projected into the path of the wipe pawl; and a key slide engaged with said key lever; substantially as and for the purpose described.

266. In a machine of the character described, the combination of an accumulator and its actuator relatively movable to establish and disestablish coöperative relationship; a pitman for producing such relative movement with provisions for varying the periods of coöperation; spring-drawn connections for changing the adjustment of said pitman; a lever for reciprocating the latter; an actuating arm having a wipe pawl to rock said lever first one way and then the other; a latch lever normally restraining said spring-drawn connections and having an angular slot; a key for displacing said latch lever; a key lever having a stud or pin engaging the angular slot of said latch lever one portion of which slot permits movement of the latter independent of movement of said key lever while the other portion of the slot provides for displacement of the latch lever by movement of the key lever, the latter adapted to enter the path of movement of the wipe pawl; and a key slide engaged with said key lever, substantially as and for the purpose described.

267. In a machine of the character described, the combination with an accumulator and its actuator, and means for disestablishing coöperative relationship between them; said means including a shiftable member and a reciprocating element carrying a double-acting pawl to operate upon said member; of a key board plate, and a key and connections for disabling said pawl with provisions for conversion of motion between said key and its connections, said key being in the form of a finger piece arranged to slide horizontally on said key board plate.

268. In a machine of the character described, the combination with an accumulator and its actuator, and means for disestablishing coöperative relationship between them; said means including a shiftable member and a reciprocating element carrying a double-acting pawl to operate upon said member; of a key board plate, a lever for disabling said pawl, and a key operatively connected to said lever, said key being in the form of a finger piece arranged to slide horizontally on said key board plate.

269. In a machine of the character described, the combination, with depressible keys, detents for holding said keys depressed, and means for displacing the detents and releasing the keys in an operation of the machine, said means comprising a vibratory arm spring actuated in one direction and normally retracted against the tension of the spring; of a slide key and hook lever for restraining said arm.

270. In a machine of the character described, the combination with depressible keys, detents for holding said keys depressed, and means for displacing the detents and releasing the keys in an operation of the machine; of a key and connections for disabling said means at will; and a key for displacing the detents and restoring said disabling key to normal.

271. In a machine of the character described, the combination, with depressible keys, detents for holding said keys depressed, and means for displacing the detents and releasing the keys in an operation of the machine; of a key and connections for disabling said means at will; a spring tending to move the said key and connections out of effective position; a latch for holding the same in such position; and a key for displacing the latch and the detents.

272. In a machine of the character described, the combination, with depressible keys, detents for holding said keys depressed; a rocking bail for displacing said detents; a vibratory arm spring actuated in one direction and normally retracted against the tension of the spring, said arm carrying a wipe pawl to act on the bail; of a slide-key; a lever engaged therewith and hooked to restrain the said arm; a latch to hold said lever in effective position; a spring connecting the latch and lever; and a key engaging the bail and said latch; substantially as and for the purpose described.

273. In a machine of the character described, the combination with accumulating and clearing mechanisms, of means for showing whether or not the accumulator is "clear"; a latch normally restraining said means; a rock arm compounded with the latch; prime mover; and an oscillatory tappet to act upon said arm at an advanced stage in the prime mover's operation and displace said latch.

274. The combination of an accumulator, means for actuating the same, item printing and clearing mechanisms, means for preventing at will actuation of the accumulator, and automatic means for specially characterizing an item first printed and added after a clearing operation and differently characterizing an item printed but not added.

275. The combination of adding and clearing and item and total printing mechanisms, means for disabling the adding mechanism and means for automatically characterizing the imprint of a total to distinguish it from other imprints, of an unadded number to distinguish it from imprints of added items and totals, and of the amount first added after a clearing operation to distinguish it from other added amounts, from unadded numbers and from totals.

276. The combination of adding and item and subtotal printing mechanisms, means for disabling the adding mechanism, and means for automatically characterizing the imprint of a subtotal to distinguish it from other imprints and of an unadded number to distinguish it from imprints of added items and subtotals.

277. The combination of adding and clearing and item and subtotal printing mechanisms, and means for automatically characterizing the imprint of a subtotal to distinguish it from other imprints and of the amount first added after a clearing operation to distinguish it from other added amounts and from subtotals.

JESSE G. VINCENT.

Witnesses:
E. P. WENGER,
R. S. MIELERT.